United States Patent
Yamaoka

(10) Patent No.: US 9,175,962 B2
(45) Date of Patent: Nov. 3, 2015

(54) PEDESTRIAN OBSERVATION SYSTEM, RECORDING MEDIUM, AND ESTIMATION OF DIRECTION OF TRAVEL

(71) Applicant: MegaChips Corporation, Osaka-shi (JP)

(72) Inventor: Takio Yamaoka, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/494,017

(22) Filed: Sep. 23, 2014

(65) Prior Publication Data

US 2015/0088408 A1    Mar. 26, 2015

(30) Foreign Application Priority Data

Sep. 26, 2013  (JP) ................................. 2013-199278
Aug. 1, 2014   (JP) ................................. 2014-157281

(51) Int. Cl.

| | |
|---|---|
| *G06F 1/26* | (2006.01) |
| *G07C 5/00* | (2006.01) |
| *G01C 21/10* | (2006.01) |
| *G01C 21/12* | (2006.01) |
| *G01C 22/00* | (2006.01) |

(52) U.S. Cl.
CPC ................ *G01C 21/10* (2013.01); *G01C 21/12* (2013.01); *G01C 22/006* (2013.01)

(58) Field of Classification Search
CPC ................................... G06F 1/26; G07C 5/008
USPC ......................................................... 701/400
See application file for complete search history.

(56) References Cited

U.S. PATENT DOCUMENTS

| | | | | |
|---|---|---|---|---|
| 7,457,705 | B2 * | 11/2008 | Takahashi et al. ............ | 701/454 |
| 7,805,275 | B2 | 9/2010 | Kitamura et al. | |
| 2003/0191582 | A1 * | 10/2003 | Terada .......................... | 701/207 |
| 2008/0190201 | A1 * | 8/2008 | Makino .......................... | 73/510 |

FOREIGN PATENT DOCUMENTS

| | | |
|---|---|---|
| JP | 2003-302419 A | 10/2003 |
| JP | 2005-114537 A | 4/2005 |
| JP | 2008-116315 A | 5/2008 |
| JP | 2009-133691 A | 6/2009 |

(Continued)

*Primary Examiner* — Muhammad Shafi
*Assistant Examiner* — Majdi Alsomiri
(74) *Attorney, Agent, or Firm* — Oblon, McClelland, Maier & Neustadt, L.L.P.

(57) ABSTRACT

A pedestrian observation system includes a circuitry acquires an acceleration in accordance with a uniquely defined terminal coordinate system accompanying a pedestrian; obtains a power of an acceleration in a horizontal plane containing mutually perpendicular first and second directions based on acceleration components in the first and second directions, thereby acquiring an observation time of a maximum value of the power and acceleration components in the first and second directions at that time to acquire horizontal peak information; acquires times of observation of maximum and minimum values of a vertical acceleration component to acquire vertical peak information; chooses information on the maximum value of the power from the horizontal peak information based on the vertical peak information to acquire peak information for estimation; and acquires traveling direction information indicating a direction of travel of a pedestrian based on the peak information for estimation.

16 Claims, 16 Drawing Sheets

(56) References Cited

FOREIGN PATENT DOCUMENTS

| JP | 2009-133692 A | 6/2009 |
| JP | 2009-156660 A | 7/2009 |
| JP | 2009-229399 A | 10/2009 |
| JP | 2009-264918 A | 11/2009 |
| JP | 2010-271167 A | 12/2010 |
| JP | 2012-145457 A | 8/2012 |
| JP | 2012-168004 A | 9/2012 |
| JP | 2012-242179 A | 12/2012 |
| WO | WO2006/104140 A1 | 10/2006 |

* cited by examiner

PEDESTRIAN OBSERVATION SYSTEM, RECORDING MEDIUM, AND ESTIMATION OF DIRECTION OF TRAVEL

BACKGROUND OF THE INVENTION

1. Field of the Invention

The present invention relates generally to a technique for estimating a direction of travel of a pedestrian using a portable terminal device.

2. Description of the Background Art

A technique has been proposed which can estimate a direction of travel of a pedestrian in a portable terminal device that has a high freedom of posture. Especially, an application for observing the movement locus of the pedestrian by making the pedestrian bring that portable terminal device therewith (PDR: Pedestrian Dead Reckoning) has been known, for example. In such an application, it is necessary to identify the direction of travel of the pedestrian.

The technique described in JP 2003-302419 (A), however, assumes that the terminal device keeps a posture that is one while the device is at a standstill, even during a walking movement, although the terminal device has a high freedom of posture. Thus, this technique has a problem of poor practicality. Moreover, in this technique, data of a sensor is directly analyzed and therefore there is a problem that this technique is sensitive to a noise. Furthermore, in this technique, acceleration data is sequentially held and therefore there is a problem of lack of portability.

In addition, the technique described in JP 2008-116315 (A) performs statistical operation for a plurality of walking steps and therefore has a problem of poor responsiveness.

Moreover, the techniques described in JP 2006-104140 (A), JP 2012-145457 (A), and JP 2012-242179 (A) require frequency conversion, autocorrelation processing, and the like and therefore have a problem of a large calculation amount.

Furthermore, in the technique described in JP 2012-168004 (A), there is a problem that, although a swinging phase and a standing phase have to be defined, it is difficult to clearly define them and therefore erroneous detection occurs frequently.

SUMMARY OF THE INVENTION

It is an object of the present invention to provide a technique for estimating a direction of travel of a pedestrian in a portable device with a high freedom of posture, that is excellent in responsiveness and the calculation amount and can reduce erroneous detection.

Therefore, the present invention is directed to a pedestrian observation system for observing a pedestrian's movement.

According to an aspect of the present invention, the system includes circuitry configured to: an acceleration detection element configured to acquire acceleration information in accordance with a terminal coordinate system that accompanies a pedestrian and is defined uniquely; a horizontal direction detection element configured to obtain a power of an acceleration in a horizontal plane based on an acceleration component in a first direction perpendicular to a vertical direction and an acceleration component in a second direction perpendicular to the vertical direction and the first direction, that are obtained from the acceleration information acquired by the acceleration detection element, thereby acquiring a time of observation of a maximum value of the power, an acceleration component in the first direction at the time of the observation of that maximum value of the power, and an acceleration component in the second direction at the time of observation of that maximum value of the power to acquire horizontal peak information; a vertical direction detection element configured to acquire times of observation of a maximum value and a minimum value of the acceleration in the vertical direction to acquire vertical peak information based on the acceleration information acquired by the acceleration detection element; a peak analysis element configured to choose, based on the vertical peak information acquired by the vertical direction detection element, information related to the maximum value of the power contained in the horizontal peak information acquired by the horizontal direction detection element, to acquire peak information for estimation; and a direction of travel estimation element configured to acquire traveling direction information indicating a direction of travel of the pedestrian based on the peak information for estimation acquired by the peak analysis element.

According to another aspect of the present invention, the system includes circuitry configured to: an acquisition element configured to acquire acceleration information acquired by an acceleration detection element accompanying a pedestrian in accordance with a terminal coordinate system defined in the acceleration detection element from the acceleration detection element; a posture estimation element configured to acquire posture information indicating a posture of the acceleration detection element with respect to an observation coordinate system suitable for observation of a walking movement of the pedestrian; a conversion element configured to perform coordinate conversion for the acceleration information acquired by the acquisition element into the observation coordinate system based on the posture information acquired by the posture estimation element, to acquire converted acceleration information; and a low-pass filter processing element configured to extract a low frequency component from the converted acceleration information acquired by the conversion element to acquire acceleration information for detection, wherein traveling direction information indicating a direction of travel of the pedestrian is calculated based on the acceleration information for detection.

The present invention is also directed to a non-transitory computer-readable recording medium storing computer-readable instructions.

According to an aspect of the present invention, execution of those instructions by a computer causes the computer to perform a direction of travel estimation method including: obtaining a power of an acceleration in a horizontal plane based on an acceleration component in a first direction perpendicular to a vertical direction and an acceleration component in a second direction perpendicular to the vertical direction and the first direction, that are obtained from the acceleration information acquired by an acceleration detection element accompanying a pedestrian in accordance with a terminal coordinate system defined in the acceleration detection element, thereby acquiring a time of observation of a maximum value of the power, an acceleration component in the first direction at the time of observation of the maximum value of the power, and an acceleration component in the second direction at the time of observation of the maximum value of the power to acquire horizontal peak information; acquiring times of observation of a maximum value and a minimum value of the acceleration in the vertical direction to acquire vertical peak information based on the acquired acceleration information; choosing information on the maximum value of the power contained in the acquired horizontal peak information based on the acquired vertical peak information, to acquire peak information for estimation; and acquiring traveling direction information indicating a direction of travel of the pedestrian based on the acquired peak information for estimation, performed by circuitry.

According to another aspect of the present invention, execution of the aforementioned instructions by a computer causes the computer to perform a direction of travel estimation method including: acquiring acceleration information acquired by an acceleration detection element accompanying a pedestrian in accordance with a terminal coordinate system defined in the acceleration detection element, from the acceleration determination element; acquiring posture information indicating a posture of the acceleration detection element with respect to an observation coordinate system suitable for observation of a walking movement of the pedestrian; performing coordinate conversion for the acquired acceleration information into the observation coordinate system based on the acquired posture information to acquire converted acceleration information; and extracting a low frequency component from the converted acceleration information to acquire acceleration information for detection, performed by circuitry, wherein traveling direction information indicating a direction of travel of the pedestrian is calculated based on the acceleration information for detection.

In addition, the present invention is also directed to a direction of travel estimation method for observing a pedestrian's movement.

According to an aspect of the present invention, the direction of travel estimation method includes: acquiring acceleration information in accordance with a uniquely defined terminal coordinate system accompanying a pedestrian; obtaining a power of an acceleration in a horizontal plane based on an acceleration component in a first direction perpendicular to a vertical direction and an acceleration component in a second direction perpendicular to the vertical direction and the first direction, that are obtained from the acquired acceleration information, thereby acquiring a time of observation of a maximum value of the power, an acceleration component in the first direction at the time of the observation of that maximum value of the power, and an acceleration component in the second direction at the time of observation of that maximum value of the power to acquire horizontal peak information; acquiring times of observation of a maximum value and a minimum value of the acceleration in the vertical direction based on the acquired acceleration information to acquire vertical peak information; choosing information related to the maximum value of the power contained in the acquired horizontal peak information based on the acquired vertical peak information, to acquire peak information for estimation; and acquiring traveling direction information indicating a direction of travel of the pedestrian based on the acquired peak information for estimation, performed by circuitry.

According to another aspect of the present invention, the direction of travel estimation method includes: acquiring acceleration information by an acceleration detection element accompanying a pedestrian in accordance with a terminal coordinate system defined in the acceleration detection element; acquiring posture information indicating a posture of the acceleration detection element with respect to an observation coordinate system suitable for observation of a walking movement of the pedestrian; performing coordinate conversion for the acceleration information into the observation coordinate system based on the posture information, to acquire converted acceleration information; and extracting a low frequency component from the converted acceleration information to acquire acceleration information for detection, performed by circuitry, wherein traveling direction information indicating a direction of travel of the pedestrian is calculated based on the acceleration information for detection.

These and other objects, features, aspects and advantages of the present invention will become more apparent from the following detailed description of the present invention when taken in conjunction with the accompanying drawings.

DESCRIPTION OF THE PREFERRED EMBODIMENTS

The detailed description of preferred embodiments of the present invention is made below, referring to the accompanying drawings. It should be noted that the descriptions related to a direction or an orientation correspond to the drawings for the convenience of description unless otherwise specified, but do not limit products, merchandized products, and the scope of the invention, for example.

The entire disclosure of Japanese Application Number 2013-199278 and 2014-157281 are expressly incorporated herein by reference.

Figure 1:
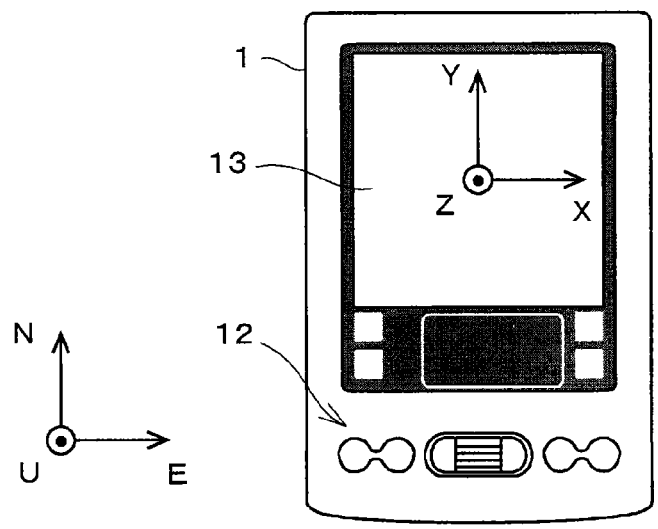
FIG. 1 shows a terminal device in a preferred embodiment of the present invention.

FIG. 1 shows a terminal device 1 in a preferred embodiment of the present invention. ENU (East-North-Up) coordinate system shown in FIG. 1 is a coordinate system independent of the terminal device 1 and is also "a coordinate system independent of a pedestrian's movement." In ENU coordinate system, an axis directed to east, an axis directed to north, and a vertically upward axis are defined as E-axis, N-axis, and U-axis, respectively. In addition, XYZ coordinate system shown in FIG. 1 is a coordinate system defined in the terminal device 1 (terminal coordinate system), and in the preferred embodiment the origin thereof is defined approximately at a center of a screen of a display 13. In the preferred embodiment, however, a direction of travel and a distance are calculated based on a relative positional relationship, and therefore the position of the origin shown in FIG. 1 is merely for the sake of convenience and may be defined at any other position.

In FIG. 1, X-axis, Y-axis, and Z-axis are shown as being coincident with E-axis, N-axis, and U-axis, respectively. However, the relative relationship between XYZ coordinate system and ENU coordinate system can vary depending on the posture of the terminal device 1 (e.g., how a pedestrian is carrying the terminal device 1 therewith). In the preferred embodiment, an example is described in which the terminal device 1 is not fixed with respect to the pedestrian.

Figure 2:
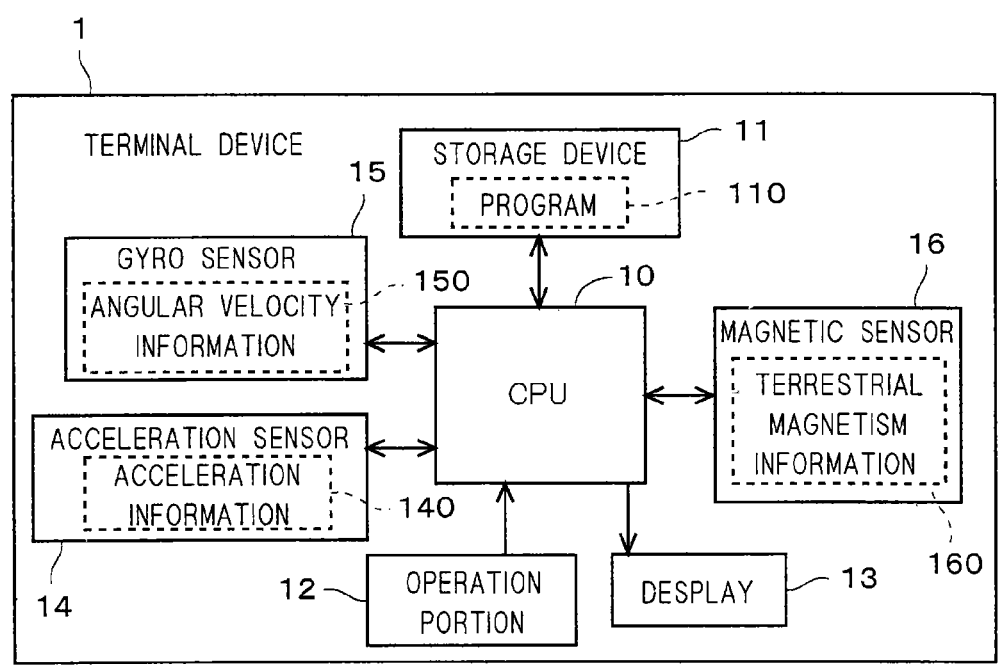
FIG. 2 is a block diagram of the terminal device.

FIG. 2 is a block diagram of the terminal device 1. The terminal device 1 includes a CPU 10 and a storage device 11 and, although the details thereof will be described later, is configured as a device which can estimate a direction of travel in a walking movement of a person who carries the terminal device 1 therewith (hereinafter, referred to as a "pedestrian").

While reading out a program 110 stored in the storage device 11, the CPU 10 executes it to perform operation for various kinds of data, generation of control signals, and the like. Thus, the CPU 10 has a function of controlling respective components included in the terminal device 1 and also has a function of calculating and generating various kinds of data. In other words, the terminal device 1 is configured as a general computer.

The storage device 11 provides a function of storing various kinds of data in the terminal device 1. That is, the storage device 11 saves information electronically fixed in the terminal device 1 therein. Especially, the storage device 11 in the preferred embodiment is used for storing the program 110.

Examples of the storage device 11 include a RAM and a buffer both of which can be used as a temporal working area of the CPU 10, a read-only-memory (ROM), a non-volatile memory (e.g., a NAND memory), a hard disk which can store a relatively large amount of data, portable storage media (e.g., a CD-ROM, a PC card, an SD card, and a USB memory) mounted in an exclusive reader device. Although FIG. 2 shows the storage device 11 as one structure, the storage device 11 is usually formed by a plurality of types of devices which are adopted as necessary from the above exemplified various types of devices (or media). That is, the storage device 11 is a generic term of a group of devices capable of storing data therein.

An actual CPU 10 is an electronic circuit including a RAM which allows a high-speed access thereto therein. Such a storage device included in the CPU 10 is also described as being included in the storage device 11 for the convenience of description. That is, the description of the preferred embodiment is made, regarding data temporarily stored in the CPU 10 itself as being also stored in the storage device 11.

As shown in FIG. 2, the terminal device 1 includes an operation portion 12 and the display 13.

The operation portion 12 is hardware which can be operated by an operator (pedestrian) for inputting various kinds of information to the terminal device 1. Examples of the operation portion 12 are various types of buttons, keys, a rotary selector, and a touch panel.

The display 13 has a function as an output portion which can output various kinds of information by displaying them. That is, the display 13 is hardware which can output information in a state where the operator can perceive it visually. Examples of the display 13 are a liquid crystal panel, a liquid crystal panel display, an organic EL display, a lamp, and an LED.

The terminal device 1 further includes an acceleration sensor 14, a gyro sensor 15, and a magnetic sensor 16 as a groups of devices for observing movement of the terminal device 1 itself. All of the acceleration sensor 14, the gyro sensor 15, and the magnetic sensor 16 are fixedly provided within the terminal device 1. Therefore, when the terminal device 1 is carried by the pedestrian, the acceleration sensor 14, the gyro sensor 15, and the magnetic sensor 16 accompany that pedestrian. Moreover, XYZ coordinate system defined in the terminal device 1 becomes a coordinate system defined with respect to the acceleration sensor 14, the gyro sensor 15, and the magnetic sensor 16 because those sensors are fixedly provided within the terminal device 1.

The terminal device 1 indirectly observes a walking movement of the pedestrian who is carrying that terminal device 1 based on information derived from the group of devices, although the details will be described later. That is, the terminal device 1 in the preferred embodiment forms a pedestrian observation system according to the present invention.

The acceleration sensor 14 detects an acceleration in the terminal device 1 to acquire acceleration information 140. The acceleration sensor 14 generates an output value represented in accordance with XYZ coordinate system defined for the terminal device 1, as the acceleration information 140.

The gyro sensor 15 measures an angular velocity in the terminal device 1 to acquire angular velocity information 150. The gyro sensor 15 in the preferred embodiment is configured as a so-called three-axis gyro sensor, and measures angular velocities around three axes (X-, Y-, and Z-axes) perpendicular to one another and outputs the measured values as the angular velocity information 150.

The magnetic sensor 16 detects terrestrial magnetism to acquire terrestrial magnetism information 160. The terrestrial magnetism information 160 is information used for determining an orientation. In the terminal device 1 of the preferred embodiment, the accuracy of the terrestrial magnetism information 160 may be improved by using a conventional technique for correcting the terrestrial magnetism information 160 acquired by the magnetic sensor 16 as appropriate.

In addition to the structure shown in FIG. 2, the terminal device 1 may include a speaker, a microphone, a camera, a communication portion, a card slot, and various types of connectors, for example.

Figure 3:
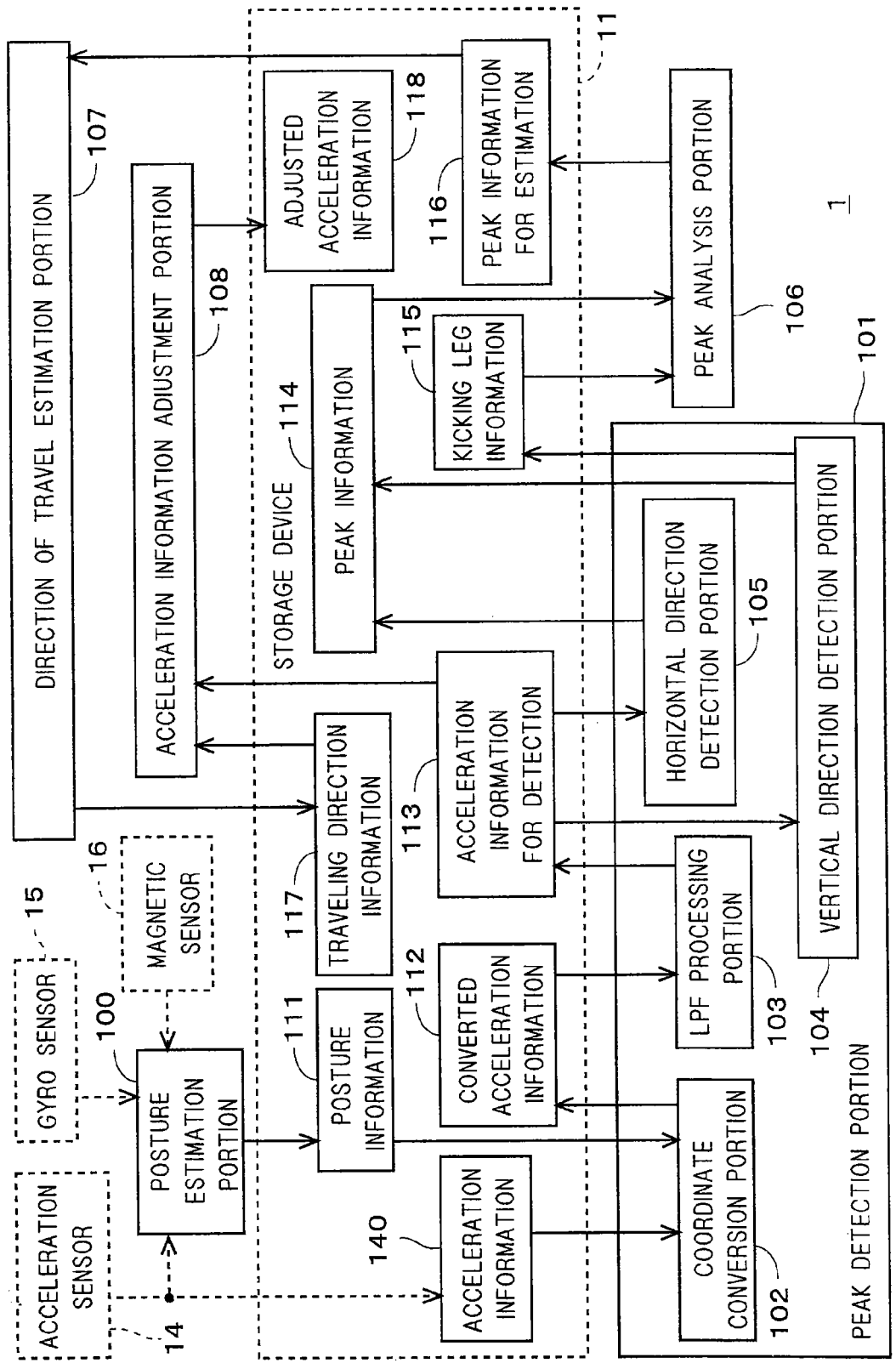
FIG. 3 shows functional blocks provided in the terminal device, together with a data flow.

FIG. 3 shows functional blocks included in the terminal device 1 together with a data flow. A posture estimation portion 100, a peak detection portion 101, a peak analysis portion 106, a direction of travel estimation portion 107, and an acceleration information adjustment portion 108 are functional blocks realized by the operation of the CPU 10 in accordance with the program 110.

In the preferred embodiment, an example is described in which all of the functional blocks included in the terminal device 1 are implemented by software, for the convenience of description. However, actually, it is preferable that a part or all of the functional blocks is implemented by hardware (is implemented into one or more chips), so that processing rate is increased and the real time property is improved. That is, it is a matter that can be chosen as appropriate in accordance with the cost, the device size, the required processing rate, or the like which of the functional blocks is implemented by hardware such as an exclusive logic circuit and which is implemented by software.

The posture estimation portion 100 acquires posture information 111 indicating a posture of the terminal device 1 with respect to ENU coordinate system, which is independent of a pedestrian's motion, substantially in real time. The posture estimation portion 100 in the preferred embodiment compositely processes the output values of the acceleration sensor 14, the gyro sensor 15, and the magnetic sensor 16 (the acceleration information 140, the angular velocity information 150, and the terrestrial magnetism information 160) with Kalman filter to acquire the posture information 111 indicating the current posture of the terminal device 1 (relative relationship between ENU coordinate system and XYZ coordinate system) by calculation.

The detailed description of the method for acquiring the posture information 111 by the posture estimation portion 100 is omitted here because conventional various techniques can be used as appropriate. However, this method is not limited to the one described in the preferred embodiment, as long as it allows acquisition of the posture information 111 indicating the posture of the terminal device 1 relative to a coordinate system independent of the pedestrian's motion. For example, a method which analyzes and uses an image of a surrounding area captured by a camera, a method which observes surroundings by ultrasonic waves or infrared radiation, a method using an GPS signal, or a method which combines a plurality of methods to complement mutually can be considered.

In this description, "substantially in real time" means to include a case in which during estimation of the traveling direction of the pedestrian acquisition is made with an interval or a delay which can be ignored. As described before, the posture estimation portion 100 obtains the posture information 111 based on the output values of the acceleration sensor 14, the gyro sensor 15, and the magnetic sensor 16. Those sensors output the output values thereof at predetermined sensing intervals (measurement intervals), respectively, and therefore cannot make continuous measurement in strict meaning. Therefore, the posture information 111 can be acquired only at at least an interval corresponding to the sensing interval. Moreover, the posture information 111 is obtained by calculation after the output values have been obtained, and therefore a delay corresponding to the time period required for the calculation also occurs. However, in a case where those temporal interval and delay are sufficiently short in view of the characteristics of a walking movement of a pedestrian (person), the posture information 111 can be regarded as being acquired "substantially in real time." Please note that a specific interval or delay in the acquisition of the posture information 111, which corresponds to "an ignorable interval or delay," varies depending on an application or the like which uses a direction of travel (traveling direction information 117) finally estimated and cannot be determined definitely.

The peak detection portion 101 acquires peak information 114 based on the acceleration information 140 acquired by the acceleration sensor 14 and the posture information 111 acquired by the posture estimation portion 100, and also acquires kicking leg information 115 related to a kicking leg of the pedestrian.

The peak information 114 will be described later.

The kicking leg information 115 indicates a time at which the kicking leg of the pedestrian has changed, and indicates a timing at which the kicking leg changes. However, for estimation of the direction of travel, motion vectors of right and left legs are composed. Thus, it is unnecessary that the kicking leg information 115 contains information which one of the right and left legs is being kicked in the preferred embodiment. In the following description, the kicking leg is referred to as a "first leg" or a "second leg" so that it is not specified which one of the right and left legs is referred to. That is, the first leg may be any of the right and left legs while the second leg is different from the first leg.

The peak detection portion 101 in the preferred embodiment includes a coordinate conversion portion 102, an LPF processing portion 103, a vertical direction detection portion 104, and a horizontal direction detection portion 105, as shown in FIG. 3.

The coordinate conversion portion 102 performs coordinate conversion for the acceleration information 140 acquired by the acceleration sensor 14 into ENU coordinate system based on the posture information 111 acquired by the posture estimation portion 100, thereby acquiring converted acceleration information 112. That is, the coordinate conversion portion 102 converts the output of the acceleration sensor 14 in accordance with the input from the posture estimation portion 100 to output the converted acceleration information 112.

By this conversion of the acceleration information 140 into a coordinate system in which observation of a walking movement of a pedestrian can be made stable (ENU coordinate system in the preferred embodiment) in advance to obtain the converted acceleration information 112, it is possible to suppress a noise which may be caused by rotation of the terminal device 1 because of the walking movement, a viewing operation and the like by the pedestrian.

The LPF processing portion 103 extracts a low frequency component from the converted acceleration information 112 acquired by the coordinate conversion portion 102 to acquire acceleration information for detection 113. That is, the LPF processing portion 103 works as a low-pass filter for the output of the coordinate conversion portion 102 and outputs the acceleration information for detection 113.

By this removal of the high frequency component, a noise and the like which have no relationship with a human walking movement can be removed. Thus, calculation (estimation) accuracy can be improved. In the preferred embodiment, a cutting frequency by the LPF processing portion 103 is approximately 5 to 10 Hz. However, the cutting frequency is not limited thereto and is preferably determined as appropriate in accordance with the characteristics of the walking movement of the pedestrian.

The vertical direction detection portion 104 refers to the acceleration information for detection 113 that is the output of the LPF processing portion 103, detects a maximum value and a minimum value of an acceleration component in U-axis direction (vertical direction) (hereinafter, represented by "$\alpha_U$"), and then stores times at which the maximum value and the minimum value have been detected, respectively, as peak information 114. That is, in the peak information 114, timings at which maximum and minimum values of the acceleration in the vertical direction have been observed during the movement of the terminal device 1 are recorded. Thus, the peak information 114 includes vertical peak information in the present invention. Please note that the maximum and minimum values themselves are not stored in the preferred embodiment, but may be stored in the peak information 114.

Also, every time the maximum value of the acceleration component $\alpha_U$ in U-axis direction (vertical direction) is detected, the vertical direction detection portion 104 determines that the kicking leg of the pedestrian has changed, and records that timing as the kicking leg information 115.

In a human walking movement, a direction to which a kicking leg is kicked is approximately a direction of travel. Therefore, it can be usually regarded that the direction of travel changes every time the kicking leg changes. More specifically, the direction of travel changes every time the kicking leg of the pedestrian changes, approximately in a zigzag pattern. That is, it is possible to determine, by referring to the kicking leg information 115, a timing at which the direction of travel in the human walking movement has to be changed.

The horizontal direction detection portion 105 composes an acceleration component in E-axis direction (hereinafter, represented by "$\alpha_E$") and an acceleration component in N-axis direction (hereinafter, represented by "$\alpha_N$") with each other to calculate a power (hereinafter represented as "PW") in a horizontal plane by Equation 1, while referring to the acceleration information for detection 113 that is the output of the LPF processing portion 103.

[Equation 1]

$$PW = \sqrt{\alpha_E^2 + \alpha_N^2} \qquad \text{(Equation 1)}$$

Then, the horizontal direction detection portion 105 detects a maximum value of the power PW in the horizontal plane thus calculated, and stores that maximum value and the acceleration component $\alpha_E$ in E-axis direction and the acceleration component $\alpha_N$ in N-axis direction at the time of detection of that maximum value, in the peak information 114. The horizontal direction detection portion 105 also stores the time of detection of that maximum value in the peak information 114.

Thus, the peak information 114 contains the time at which the maximum value of the power PW has been detected, the value (maximum value) of the power PW at that time, and the acceleration components $\alpha_E$ and $\alpha_N$ at the time at which the maximum value of the power PW has been detected. That is, the peak information 114 contains horizontal peak information in the present invention.

The peak analysis portion 106 chooses information related to the maximum value of the power contained in the horizontal direction peak information acquired by the horizontal direction detection portion 105 based on the vertical direction peak information acquired by the vertical direction detection portion 104, thereby acquiring peak information for estimation 116.

Moreover, the peak analysis portion 106 acquires the peak information for estimation 116 based on the peak information 114 acquired by the peak detection portion 101 and the kicking leg information 115. A specific technique for generating the peak information for estimation 116 will be described later.

The direction of travel estimation portion 107 calculates traveling direction information 117 indicating the direction of travel of the pedestrian based on the peak information for estimation 116 acquired by the peak analysis portion 106. The traveling direction information 117 (the direction of travel of the pedestrian) in the preferred embodiment is obtained as a phase angle relative to E-axis in ENU coordinate system, for example. That is, the orientation of the direction of travel of the pedestrian can be determined by obtaining the traveling direction information 117.

The acceleration information adjustment portion 108 converts the acceleration information for detection 113 based on the traveling direction information 117, thereby acquiring adjusted acceleration information 118.

Here, the meaning of acquisition of the adjusted acceleration information 118 by the acceleration information adjustment portion 108 is described.

Figure 4:
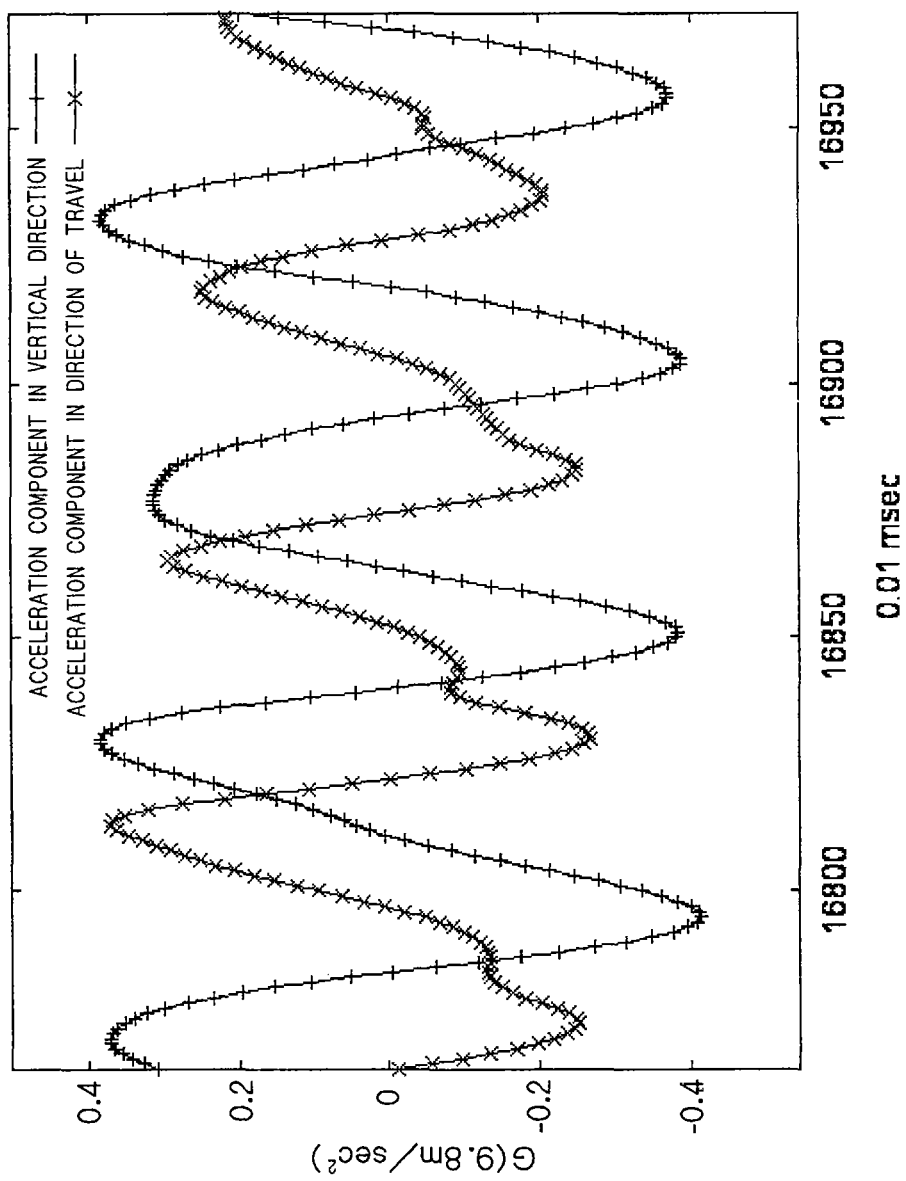
FIG. 4 shows a typical acceleration pattern in a human walking movement.

FIG. 4 shows a typical acceleration pattern in a human walking movement. In FIG. 4, a change in the vertical acceleration component and a change in the acceleration component in the direction of travel in that walking movement, assuming the horizontal axis to be a time axis.

In PDR (Pedestrian Dead Reckoning), for example, for precise analysis of a walking movement of a pedestrian, it is preferable to obtain the vertical acceleration component and the acceleration component in the direction of travel in that walking movement. In order to acquire those acceleration components, the acceleration sensor is provided.

However, a general acceleration sensor is designed to output an output value in accordance with its own uniquely defined coordinate system (terminal coordinate system, i.e., XYZ coordinate system in the preferred embodiment). Therefore, it is necessary to extract the vertical acceleration component and the acceleration component in the direction of travel of the pedestrian from the output value of the acceleration sensor (output value in accordance with the terminal coordinate system).

For realizing this extraction (conversion) with high accuracy, it is necessary to estimate a relative relationship (rotation angle) between the terminal coordinate system and the vertical direction and the direction of travel with high accuracy. When that relative relationship can be estimated, the vertical acceleration component and the acceleration component in the direction of travel of the pedestrian can be obtained from the output value in accordance with the terminal coordinate system (i.e., the output value of the acceleration sensor) by using the estimated relative relationship.

For the vertical direction, estimation can be performed relatively easily based on gravitational acceleration that is constantly observed, for example. That is, the relative relationship between the terminal coordinate system and the vertical direction can be obtained relatively precisely by a conventional technique.

For the direction of travel, a technique for estimating it has been already proposed (in Patent Publications discussed as Background Art, for example). However, those conventional techniques still have many problems, as described above. Therefore, estimation of the direction of travel of the pedestrian with high accuracy has a difficulty even if those techniques are applied.

The acceleration information adjustment portion 108 converts the acceleration information 140 that is the output value of the acceleration sensor 14 (in the preferred embodiment, the acceleration information for detection 113 obtained by further processing of the acceleration information 140 to be more suitable form) based on the estimated direction of travel (traveling direction information 117), thereby obtaining the adjusted acceleration information 118. Thus, it is expected that the adjustment acceleration information 118 while the pedestrian is actually walking is the typical pattern shown in FIG. 4. Therefore, by analysis of the adjusted acceleration information 118, it is possible to determine whether or not the pedestrian is currently walking and perform other analysis for the walking movement precisely.

The acceleration information adjustment portion 108 in the preferred embodiment does not perform extraction of the vertical acceleration component. This is because, in the preferred embodiment, the vertical acceleration component has been already extracted from the acceleration information 140 by the aforementioned coordinate conversion portion 102 so that the converted acceleration information 112 is generated, and the acceleration information for detection 113 is generated without conversion of the coordinate system of that converted acceleration information 112. In this manner, the acceleration information for detection 113 is information for which extraction of the vertical acceleration component has been completed and it is therefore unnecessary for the acceleration information adjustment portion 108 to extract the vertical acceleration component.

The above is the description of the structure and functions of the terminal device 1 in the preferred embodiment. Next, a method for estimating a direction of travel of a pedestrian by using the terminal device 1 is described.

Figure 5:
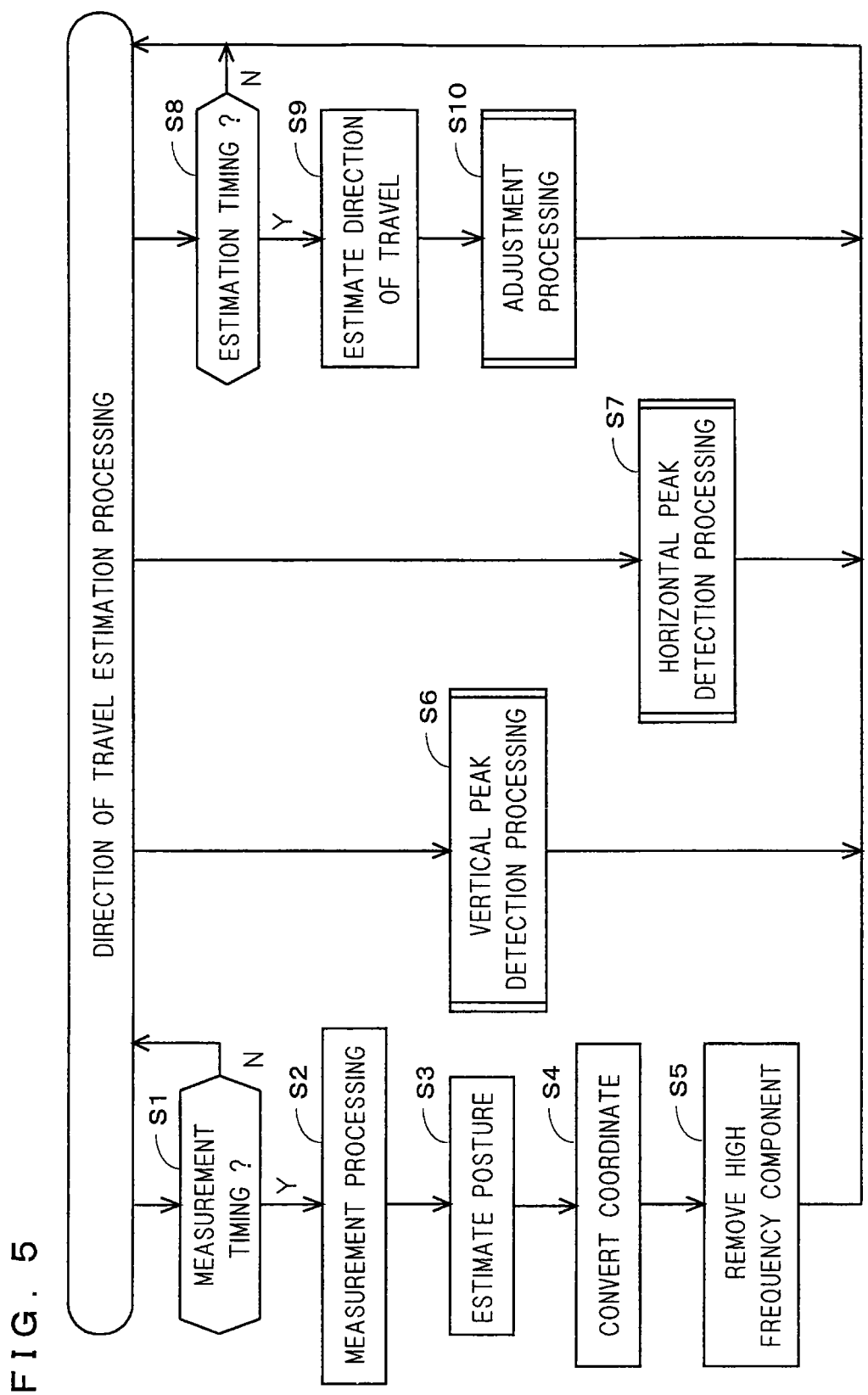
FIG. 5 is a flowchart of processing for estimating a direction of travel in the terminal device.

FIG. 5 is a flowchart of processing for estimating the direction of travel in the terminal device 1.

When a power of the terminal device 1 has been turned on to start the terminal device 1, the terminal device 1 in the preferred embodiment executes a predetermined initial setting and starts the processing for estimating the direction of travel shown in FIG. 5. Unless otherwise specified, the CPU 10 operates in accordance with the program 110 to control the respective components of the terminal device 1, thereby the processing for estimating the direction of travel shown in FIG. 5 is implemented.

When having started the processing for estimating the direction of travel, the CPU 10 monitors whether or not a measurement timing has come and an estimation timing has come (Steps S1 and S8) and is placed in a state where the CPU 10 executes the vertical peak detection processing (Step S6) and the horizontal peak detection processing (Step S7). This state is referred to a "normal state" in the following description.

In the normal state, the terminal device 1 (CPU10) may monitor another state or execute other processing. For example, in the normal state, another application may be started and processing required for that application may be executed as appropriate, while the above timings are being monitored.

The measurement timing is a timing at which the sensors provided in the terminal device 1 (i.e., the acceleration sensor 14, the gyro sensor 15, and the magnetic sensor 16) perform measurements for objects of the measurements, respectively. In the preferred embodiment (FIG. 5), the description is made assuming that the measurement timings of the respective sensors are the same for the sake of convenience. However, those measurement timings may be different among the sensors. Moreover, for improvement of the real time property, it is preferable that the period of the measurement timing be set so that the measurement timing comes at a sufficiently short interval in view of the characteristics of the walking movement.

The estimation timing is a timing at which the direction of travel is estimated and the traveling direction information 117 is generated.

In the normal state, when the measurement timing has come, the CPU 10 determines to be Yes in Step S1 and executes measurement processing (Step S2). The measurement processing is processing in which the acceleration sensor 14, the gyro sensor 15, and the magnetic sensor 16 are made to measure acceleration, angular velocity, and terrestrial magnetism, respectively. By execution of Step S2, the acceleration information 140, the angular velocity information 150, and the terrestrial magnetism information 160 are acquired. That is, every time Step S2 is executed, the output value of the acceleration sensor 14 at that time is recorded in the acceleration information 14, the output value of the gyro sensor 15 at that time is recorded in the angular velocity information 150, and the output value of the magnetic sensor 16 at that time is recorded in the terrestrial magnetism information 160.

When Step S2 has been executed and the acceleration information 140, the angular velocity information 150, the terrestrial magnetism information 160 have been updated with newly measured values, the CPU 10 (posture estimation portion 100) then estimates the posture of the terminal device 1 (Step S3).

In Step S3, based on the values measured by the acceleration sensor 14, the gyro sensor 15, and the magnetic sensor 16 in Step S2, the posture estimation portion 100 re-estimates the posture of the terminal device 1 to generate the posture information 111. As described before, a conventional technique can be applied to the processing for estimating the posture of the terminal device 1 as appropriate in the preferred embodiment, for example. Therefore, the detailed description is omitted.

In the preferred embodiment, every time Step S2 is executed, Step S3 is executed as is apparent from FIG. 5. Thus, every time newly measured values are obtained by the respective sensors, the posture estimation portion 100 newly estimates the posture of the terminal device 1. However, it is not always necessary to re-estimate the posture every time newly measured values are obtained. For example, every time measured values of a predetermined number of measurements are obtained, Step S3 may be executed. Alternatively, Step S3 may be executed only in a case where the posture of the terminal device 1 can be regarded as having changed based on the newly measured values.

When the posture information 111 has been newly obtained, the coordinate conversion portion 102 performs conversion (coordinate conversion) for the acceleration information 140 based on that newly obtained posture information 111, thereby generating the converted acceleration information 112 (Step S4). Thus, the acceleration information 140 (XYZ coordinate system) is converted into ENU coordinate system, so that the converted acceleration information 112 is generated.

Then, the LPF processing portion 103 removes a high frequency component from the converted acceleration information 112, thereby generating the acceleration information for detection 113 (Step S5).

In this manner, the terminal device 1 generates the acceleration information for detection 113 from the acceleration information 140 obtained in the measurement processing (Step S2). Thus, the acceleration information 140 is converted into ENU coordinate system suitable for observation of a walking movement and a noise caused by rotation of the terminal device 1 is removed from the acceleration information 140, so that the acceleration information for detection 113 is obtained. When the acceleration information for detection 113 has been generated, the terminal device 1 returns to the normal state.

Next, the vertical peak detection processing (Step S6) to be executed in the normal state is described.

Figure 6:
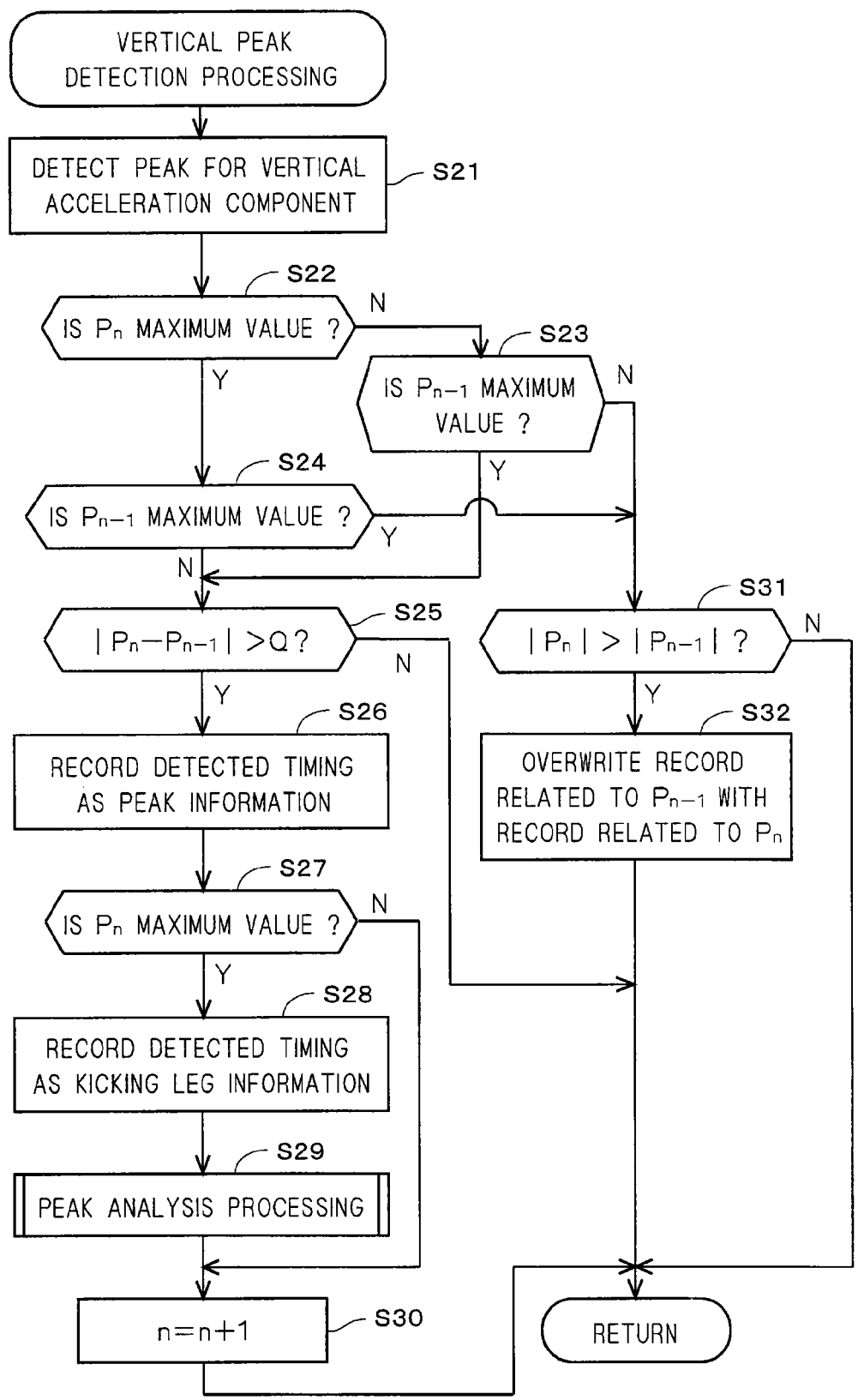
FIG. 6 is a flowchart of vertical peak detection processing executed by the terminal device in the preferred embodiment.

FIG. 6 is a flowchart of the vertical peak detection processing executed by the terminal device 1 in the preferred embodiment.

When the vertical peak detection processing has been started, the vertical direction detection portion 104 detects a peak (maximum value or minimum value) for the acceleration component $\alpha_U$ in the vertical direction contained in the acceleration information for detection 113 (Step S21), while referring to the acceleration information for detection 113. In the following description, the peak detected in Step S21 is represented by "$P_n$." n is a suffix indicating that $P_n$ represents the peak detected in the n-th detection and is a natural number equal to or larger than 1. Moreover, $P_0$ is a predetermined constant that can be determined as appropriate.

In Step S21, when having detected the peak $P_n$, the vertical direction detection portion 104 determines whether or not that peak $P_n$ is a maximum value (Step S22).

In a case where the peak $P_n$ is a minimum value (No in Step S22), the vertical direction detection portion 104 further determines whether or not the peak $P_{n-1}$ detected immediately before is a maximum number (Step S23).

When the determination result in Step S23 is Yes, the vertical direction detection portion 104 executes Step S25 (described later). The case where the determination result is Yes in Step S23 means that the newly detected peak $P_n$ is the minimum value and the peak $P_{n-1}$ detected immediately before is the maximum value. That is, the maximum value has been detected next to the minimum value. (However, as for the order of occurrence, the maximum value occurred prior to the minimum value.) In this case, the vertical direction detection portion 104 executes Step S25.

In a case where the peak $P_n$ is the maximum value in Step S22 (Yes in Step S22), it is further determined whether or not the peak $P_{n-1}$ detected immediately before is the maximum value (Step S24).

When the determination result in Step S24 is No, the vertical direction detection portion 104 executes Step S25 (described later). The case where the determination result is No in Step S24 means that the newly detected peak $P_n$ is the maximum value and the peak $P_{n-1}$ detected immediately before is the minimum value. That is, the case means that the minimum value has been detected next to the maximum value. (However, as for the order of occurrence, the minimum value occurred prior to the maximum value.) In this case, the vertical direction detection portion 104 executes Step S25.

By execution of Steps S22, S23, and S24 in this manner, Step S25 becomes processing to be executed in a case where the maximum value and the minimum value have been detected alternately.

In a case where the maximum value and the minimum value have been detected alternately, the vertical direction detection portion 104 determines whether or not the amplitude of the acceleration component $\alpha_U$ is larger than a threshold value Q (Step S25). For the threshold value Q, an initial value is predetermined. Although the detailed description is omitted, an appropriate value of the threshold value Q is dynamically calculated as a constant ratio of the amplitude of the detected vertical acceleration component $\alpha_U$ and is updated in the preferred embodiment, for example.

When that amplitude is equal to or smaller than the threshold value Q (No in Step S25), the newly detected peak $P_n$ is not employed as a peak and Steps S26 to S30 are skipped, so that the flow goes back to the processing shown in FIG. 5. In this case, n is not incremented because Step S30 is not executed.

On the other hand, in a case where that amplitude is larger than the threshold value Q (Yes in Step S25), the vertical direction detection portion 104 records the time (timing) of detection of the peak $P_n$ as peak information 114, irrespective of whether or not the peak $P_n$ is the maximum value (Step S26). Thus, the peak $P_n$ detected in the current detection is employed as the peak.

The peak information 114 acquired in Step S26 is information indicating the observation times of the maximum value and the minimum value of the vertical acceleration component $\alpha_U$ acquired by the vertical direction detection portion 104. Therefore, the peak information 114 contains information corresponding to the vertical peak information of the present invention. In the following description, the observation time of the maximum value of the vertical acceleration component $\alpha_U$ is referred to as "$T_{max}$" and the observation time of the minimum value thereof is referred to as "$T_{min}$."

When having executed Step S26, the vertical direction detection portion 104 determines whether or not the peak $P_n$ is the maximum value (Step S27).

In a case where the peak $P_n$ is the minimum value (No in Step S27), the vertical direction detection portion 104 skips Steps S28 and S29, increments n (Step S30), and ends the vertical peak detection processing, and the flow goes back to the processing shown in FIG. 5. That is, in a case where the peak $P_n$ is the minimum value, the detection timing of that peak $P_n$ is not recorded as kicking leg information 115 and the peak analysis processing (Step S29) is not executed.

On the other hand, in a case where the peak $P_n$ is the maximum value (Yes in Step S27), the vertical direction detection portion 104 records the time (timing) of detection of that peak $P_n$ as the kicking leg information 115, by regarding the detection time (timing) of that peak $P_n$ as the timing at which the kicking leg of the pedestrian has changed (Step S28).

When having executed Step S28, the peak analysis portion 106 executes peak analysis processing (Step S29). The peak analysis processing is processing for, every time the peak $P_n$ (i.e., the maximum value of the vertical acceleration component $\alpha_U$) is detected, performing analysis of the peak $P_{n-1}$ (the peak detected immediately before). The details of the peak analysis processing in Step S29 will be described later.

When having executed Step S29, the vertical direction detection portion 104 increments n (Step S30) and ends the vertical peak detection processing, and the flow goes back to the processing shown in FIG. 5.

Next, in FIG. 6, a case where the determination result by the vertical direction detection portion 104 in Step S23 is No, or a case where the determination result in Step S24 is Yes is described.

In the case where the determination result is No in Step S23, the newly detected peak $P_n$ is a minimum value and the peak $P_{n-1}$ detected immediately before is a minimum value. That is, the case means that the minimum values have been detected successively. The successive detection of the minimum values does not occur in peak detection usually. In the preferred embodiment, however, the detected peak is not employed as the peak in some cases depending on situations (e.g., a case where the determination result is No in Step S25). Therefore, in a case where the maximum value detected after the minimum value has not been employed, for example, such successive detection of the minimum values can occur on appearance. In this case, the vertical direction detection portion 104 executes Step S31 (described later).

Moreover, in the case where the determination result is Yes in Step S24, the newly detected peak $P_n$ is a maximum value and the peak $P_{n-1}$ detected immediately before is a maximum value. That is, the case means that the maximum values have been detected successively. The successive detection of the maximum values does not occur in peak detection usually. In the preferred embodiment, however, the detected peak is not employed as the peak in some cases, as described before. Therefore, in a case where the minimum value detected after the maximum value has not been employed, for example, such successive detection of the maximum values can occur on appearance. Also in this case, the vertical direction detection portion 104 executes Step S31.

By execution of Steps S22, S23, and S24 in this manner, Step S31 becomes processing to be executed in the case where the maximum values (or minimum values) have been detected successively.

In the case of successive detection of the maximum values (or minimum values), the vertical direction detection portion 104 compares the absolute value of the peak $P_n$ detected in this detection and the absolute value of the peak $P_{n-1}$ detected immediately before with each other and determines whether or not the absolute value of the peak $P_n$ detected in this detection is larger (Step S31).

In a case where the absolute value of the peak $P_n$ is larger (Yes in Step S31), the vertical direction detection portion 104 overwrites the record related to the peak $P_{n-1}$ that has been already recorded in the kicking leg information 115 and the peak information 114, with information related to the peak $P_n$ detected in this detection (Step S32). In other words, the vertical direction detection portion 104 overwrites the timing of detection of the peak $P_{n-1}$ in the peak information 114 with the timing of detection of the peak $P_n$. Moreover, when the peak $P_n$ is the maximum value (in this case the peak $P_{n-1}$ is also the maximum value), the vertical direction detection portion 104 overwrites the timing of detection of the peak $P_{n-1}$ in the kicking leg information 115 with the timing of detection of the peak $P_n$. Please note that, since the peak analysis processing for the peak $P_{n-1}$ has not been executed yet, it is not necessary to modify this.

The case where the determination result in Step S31 is Yes is a case where the maximum values (or the minimum values) have been detected successively (i.e., a case where Step S31 is executed) and the absolute value of the peak $P_n$ detected in this detection is larger than the absolute value of the peak $P_{n-1}$ detected immediately before. That case means that the peak $P_n$ detected in this detection is more appropriate as the peak than the peak $P_{n-1}$ detected immediately before. Therefore, when the determination result in Step S31 is Yes, the vertical direction detection portion 104 executes Step S32 because the peak $P_{n-1}$ detected immediately before is not employed as the peak. After execution of Step S32, the vertical direction detection portion 104 ends the vertical peak detection processing, and the flow goes back to the processing shown in FIG. 5.

On the other hand, the case where the determination result in Step S31 is No is a case where the maximum values (or the minimum values) have been detected successively (the case where Step S31 is executed) and the absolute value of the peak $P_{n-1}$ detected immediately before is equal to or larger than the absolute value of the peak $P_n$ detected in this detection. That case means that the peak $P_{n-1}$ detected immediately before is more appropriate than the peak $P_n$ detected in this detection, as the peak that is to be recorded. Therefore, when the determination result in Step S31 is No, the vertical direction detection portion 104 ends the vertical peak detection processing without keeping the record related to the peak $P_n$ detected in this detection, and the flow goes back to the processing shown in FIG. 5.

As described above, when the maximum values (or minimum values) have been successively detected, Step S32 is executed, so that either one of the followings occurs, i.e., the peak $P_{n-1}$ detected immediately before is not employed (record deletion) or the peak $P_n$ detected in this detection is not employed (not recorded). That is, only either one of the peak $P_{n-1}$ and the peak $P_n$ is kept in record. Thus, in the peak information 114, the maximum value and the minimum value of the vertical acceleration component $\alpha_U$ is always alternately recorded.

Next, horizontal peak detection processing (Step S7) to be executed in the normal state is described.

Figure 7:
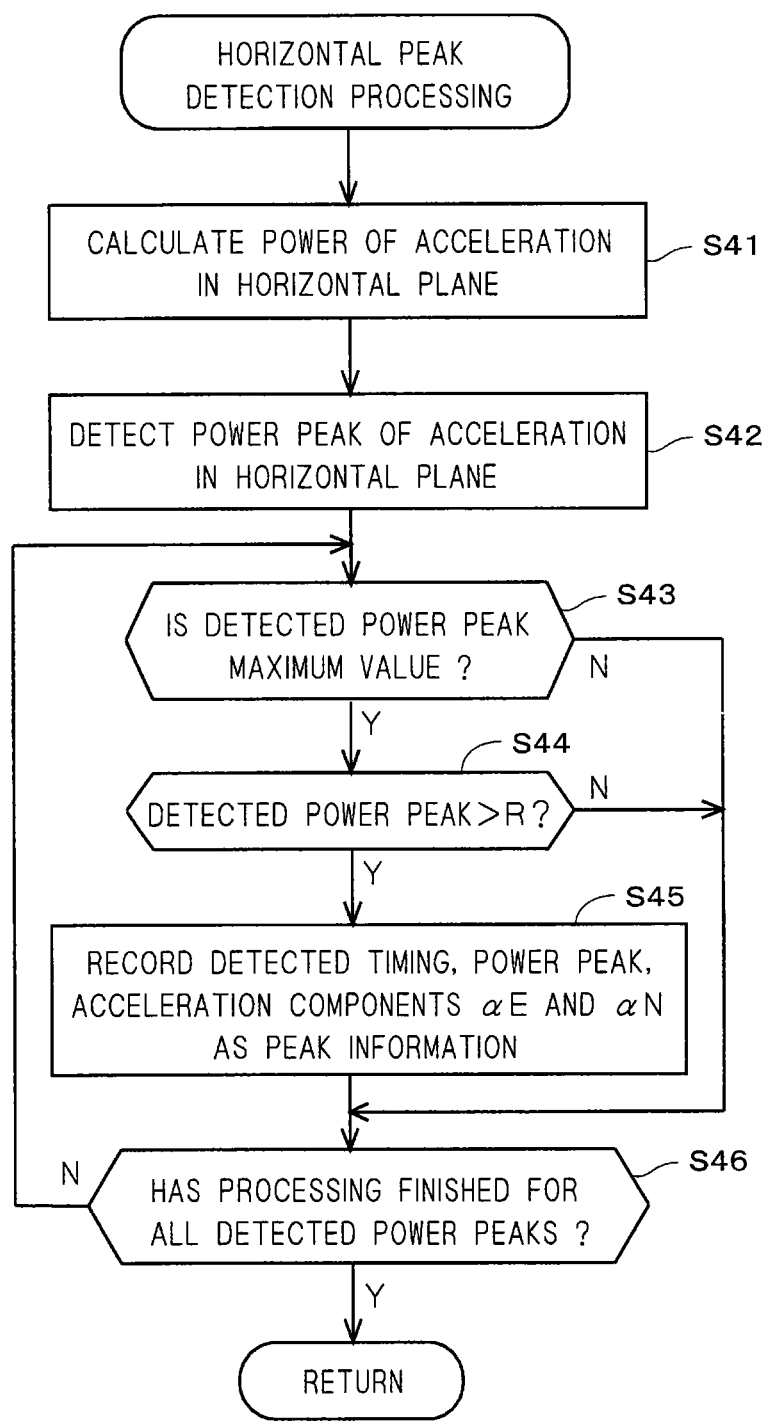
FIG. 7 is a flowchart of horizontal peak detection processing executed by the terminal device in the preferred embodiment.

FIG. 7 is a flowchart of the horizontal peak detection processing that is executed by the terminal device 1 in the preferred embodiment.

When having started the horizontal peak detection processing, the horizontal direction detection portion 105 refers to the acceleration information for detection 113, and calculates a power PW of the acceleration in the horizontal plane based on the acceleration components $\alpha_E$ and $\alpha_N$ indicated in that acceleration information for detection 113 in accordance with Equation 1 (Step S41). That is, the horizontal direction detection portion 105 obtains the power PW of the acceleration in the horizontal plane based on an acceleration component (acceleration component $\alpha_E$) in the first direction (E-axis direction) perpendicular to the vertical direction and an acceleration component (acceleration component $\alpha_N$) in the second direction (N-axis direction) perpendicular to the vertical direction and the first direction in Step S41.

Figure 8:
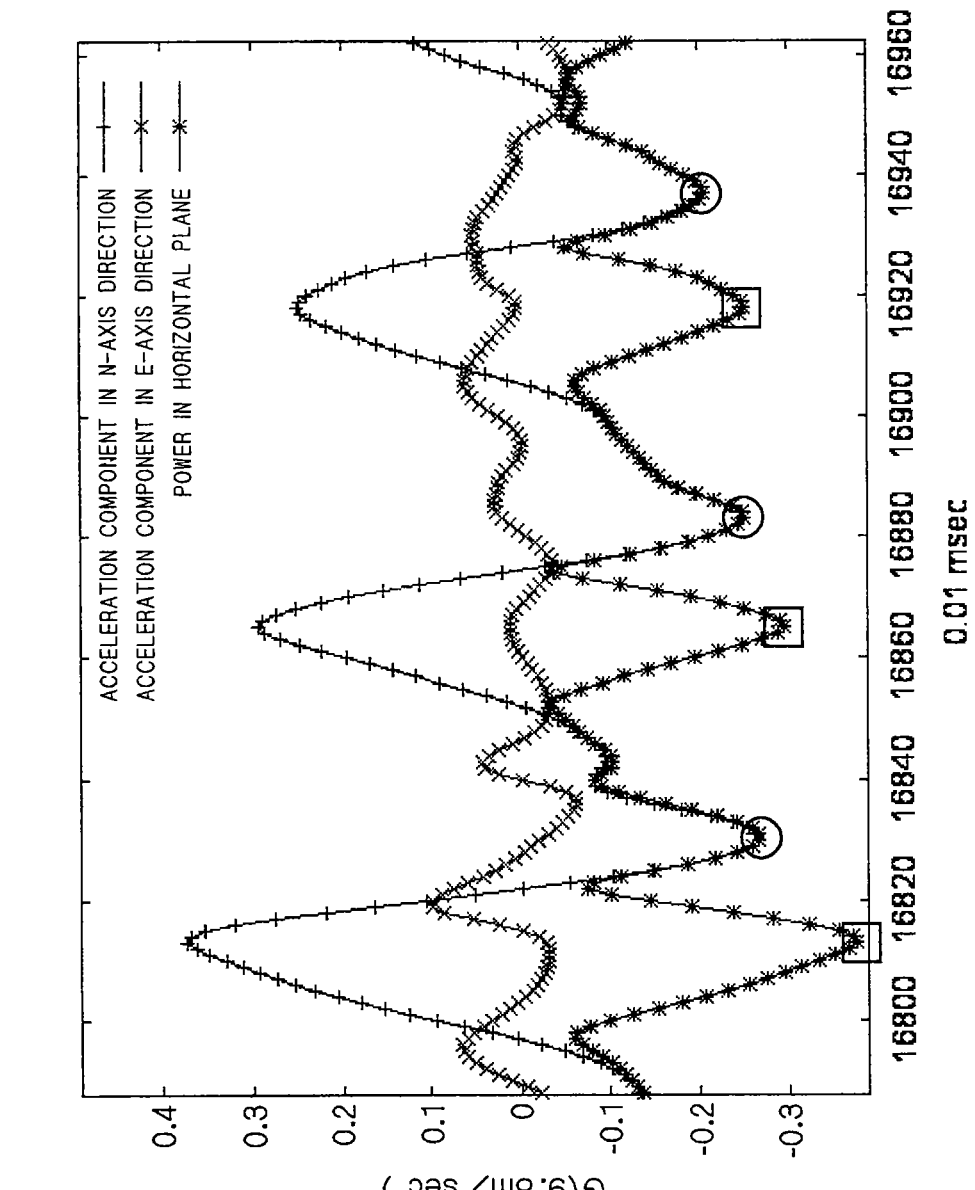
FIG. 8 exemplifies acceleration components $\alpha_E$ and $\alpha_N$ and an acceleration power PW in a horizontal plane, assuming the horizontal axis to be the time axis.

FIG. 8 illustrates exemplary acceleration components $\alpha_E$ and $\alpha_N$ and an exemplary acceleration power PW in the horizontal plane, assuming the horizontal axis thereof to be a time axis. Please note that in FIG. 8 the positive and the negative are inverted for the power PW, considering visibility.

When Step S41 is executed based on the horizontal acceleration component $\alpha_E$ and $\alpha_N$ exemplified in FIG. 8, the power PW exemplified in FIG. 8 is obtained (the positive and the negative are inverted in FIG. 8).

When the power PW has been obtained, the horizontal direction detection portion 105 detects a peak for the obtained power PW (a power peak) (Step S42).

In the processing for detecting the peak in Step S42, a maximum value and a minimum value of the power PW, that are within a predetermined time period (within an elapsed time from the timing of the previous detection), are detected. That is, not only the maximum value but also the minimum value are detected. In the preferred embodiment, however, for the horizontal direction, only the maximum value of the power PW becomes an issue in estimation of the direction of travel. Therefore, the horizontal direction detection portion 105 determines whether or not each power peak detected in Step S42 is a maximum value (Step S43).

In a case where the detected power peak is a maximum value (Yes in Step S43), it is further determined whether or not the thus detected power peak is larger than a threshold value R (Step S44). When the detected power peak is larger than the threshold value R (Yes in Step S44), the horizontal direction detection portion 105 records the time (timing) of detection of that power peak, the value of the peak, and acceleration components $\alpha_E$ and $\alpha_N$ at the time of detection of that power peak as peak information 114 (Step S45).

Thus, the peak information 114 contains the time at which the maximum value of the power PW has been observed, an acceleration component in the first direction (E-axis direction) when that maximum value of the power has been observed, and an acceleration component in the second direction (N-axis direction) when that maximum value of the power has been observed. That is, the peak information 114 contains information corresponding to horizontal peak information in the present invention.

Please note that the peak information 114 in the preferred embodiment also contains the value of the power peak (the power PW when it is the maximum). The value of the power peak may not be stored as the peak information 114, but may be calculated by Equation 1 based on the acceleration components $\alpha_E$ and $\alpha_N$ contained in the peak information 114 every time the value of the power peak is needed. Moreover, for the threshold value R, it is assumed that an initial value is preset. In the preferred embodiment, an appropriate value of the threshold value R is dynamically calculated as a constant ratio of the detected power peak in the horizontal plane and updated, for example.

When the detected power peak is equal to or smaller than the threshold value R in Step S44, the horizontal direction detection portion 105 skips Step S45. That is, information related to that power peak is not recorded in the peak information 114.

On the other hand, when the detected power peak is a minimum value detected in Step S43, the horizontal direction detection portion 105 skips Steps S44 and S45. That is, for the power PW in the horizontal direction, information related to the minimum value is not recorded in the peak information 114.

When having ended the processing for one power peak, the horizontal direction detection portion 105 determines whether or not the processing has been finished for all the peaks detected in Step S 42 (Step S46). In a case where there is an unprocessed peak (No in Step S46), the flow goes back to Step S43 and the horizontal direction detection portion 105 repeats the processing for the unprocessed peak.

By execution of this horizontal peak detection processing in this manner, for the example of FIG. 8, information related to peaks in squares (those look minimum values in FIG. 8 because of inversion, but are actually maximum values) and peaks in circles (those looks minimum values because of inversion, but are actually maximum values) is recorded in the peak information 114.

When having finished the processing for all the peaks detected in Step S42 (Yes in Step S46), the horizontal direction detection portion 105 ends the horizontal peak detection processing, and the flow goes back to the processing shown in FIG. 5.

In the above description, it has been apparent how the peak information 114 and the kicking leg information 115 are generated and what those are. Next, peak analysis processing shown in FIG. 6 (Step S29) is described.

Figure 9:
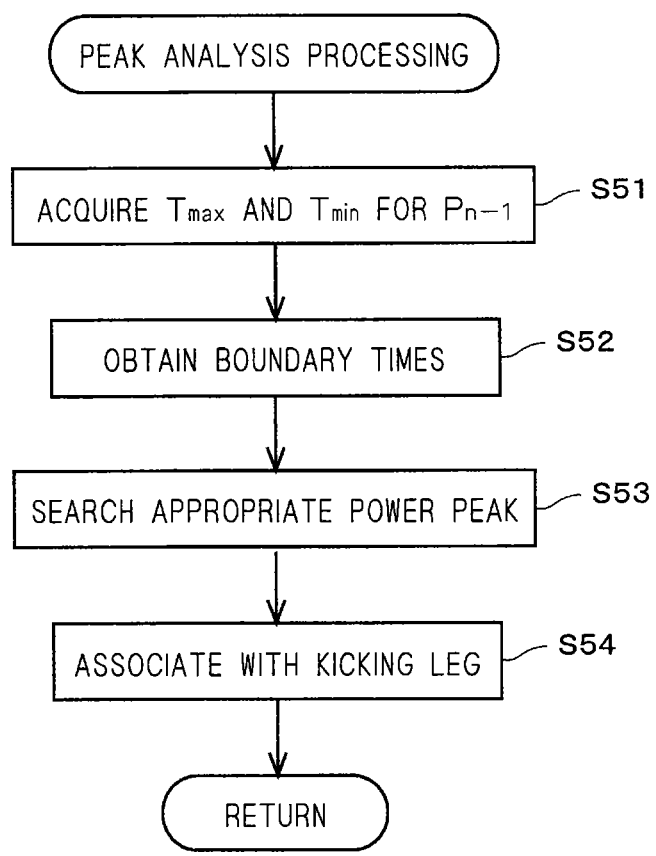
FIG. 9 is a flowchart of peak analysis processing.

FIG. 9 is a flowchart of the peak analysis processing. The peak analysis processing is processing for, every time the peak $P_n$ (the maximum value of the vertical acceleration component $\alpha_U$) has been detected, performing analysis of the peak $P_{n-1}$ (peak detected immediately before), although it has been described before.

When having started the peak analysis processing, the peak analysis portion 106 refers to the peak information 114 and acquires the detection time of the peak $P_{n-2}$ (represented as "$T_{max}$" because the peak $P_{n-2}$ is the maximum value) and the detection time of the peak $P_{n-1}$ (represented as "$T_{min}$" because the peak $P_{n-1}$ is the minimum value) (Step S51).

Then, the peak analysis portion 106 executes Equations 2 and 3 to obtain boundary times $b_0$ and $b_1$ (Step S52).

[Equation 2]

$$b_0 = T_{max} - A(T_{min} - T_{max}) \quad \text{(Equation 2)}$$

[Equation 3]

$$b_1 = T_{max} + B(T_{min} - T_{max}) \quad \text{(Equation 3)}$$

Please note that A and B in Equations 2 and 3 are arbitrary coefficients.

When the boundary times $b_0$ and $b_1$ have been obtained, the peak analysis portion 106 refers to the peak information 114 to search the maximum value of the peaks of the power PW in the horizontal plane detected in a period from the boundary time $b_0$ to the boundary time $b_1$ (search period) as an appropriate power peak (Step S53).

Figure 10:
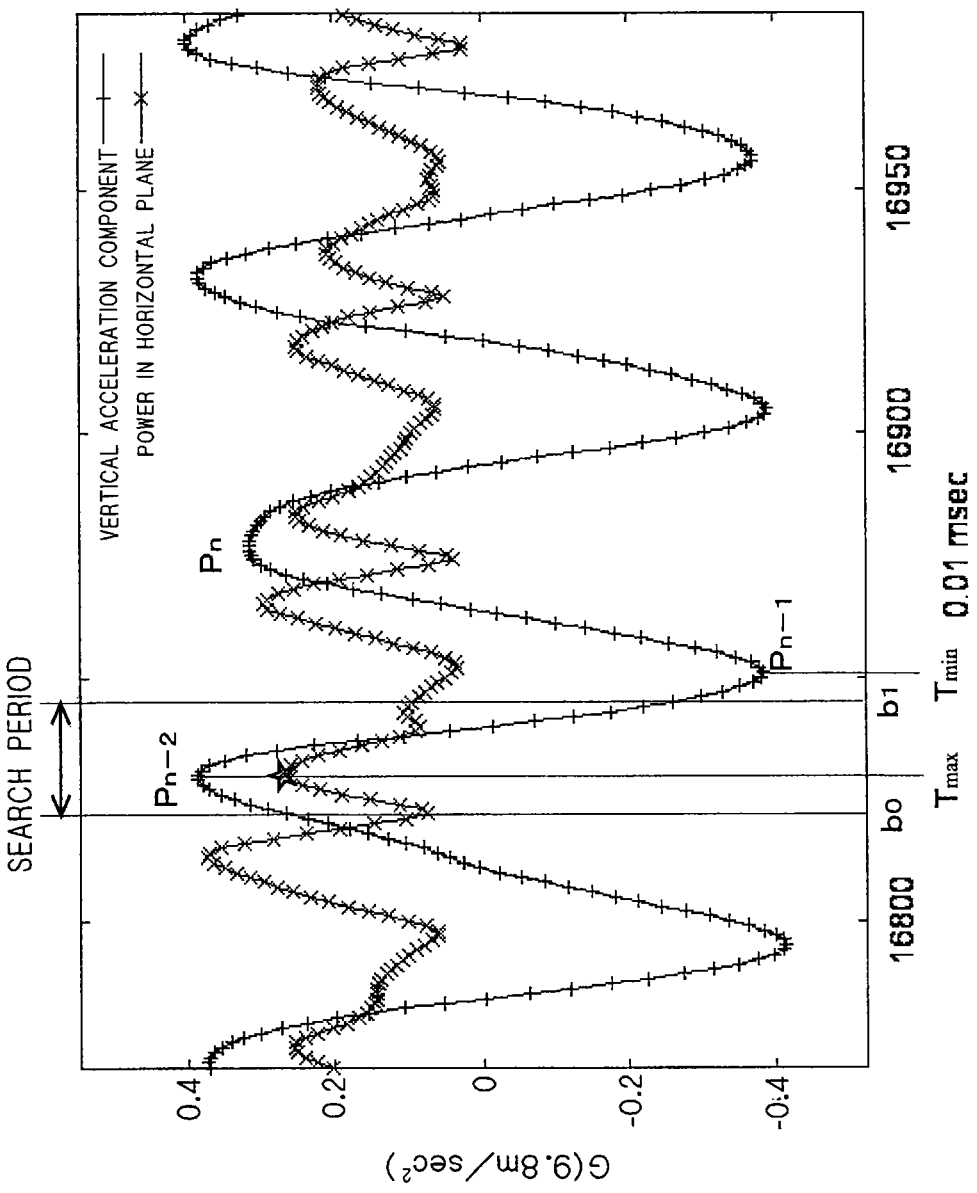
FIG. 10 schematically shows search of an appropriate power peak.

FIG. 10 is a conceptual diagram illustrating how to search the appropriate power peak.

From "$T_{max}$" and "$T_{min}$" acquired from the peak information 114 in Step S51, the boundary times $b_0$ and $b_1$ are obtained by execution of Step S52, thereby the period in which the search of the power peak is made in the peak information 114 (the search period) is determined. When the search period has been determined, one(s) among the peaks of the power PW in the horizontal plane that have been already detected and recorded in the peak information 114, that are within the search period, is/are determined.

When a plurality of peaks have been found in the search period, values of those peaks are compared and the largest one is determined. That is, the values of the power PW (peak values) contained in the peak information 114 are referred to for the search of the maximum one of the plurality of peaks found in the search period.

Thus, a peak marked with star in FIG. 10 is extracted from the peak information 114 as an appropriate power peak in the horizontal plane. The power peak searched (extracted) as the appropriate power peak in this manner is a power peak in a circle in FIG. 8. To the contrary, the power peaks in the squares in FIG. 8 are not contained in the search period and therefore are not extracted also thereafter.

In FIG. 8, the power peaks in the squares are considered as peaks in an accelerating direction of a horizontal velocity. In a human walking movement, various noises from a kicking leg have effects during acceleration. Therefore, at a peak in the accelerating direction, it is highly likely that reliability of the direction of travel is low. On the other hand, during deceleration, the walking movement decelerates spontaneously and therefore it is expected that the direction of travel at a peak in a decelerating direction is highly reliable. For this reason, the peak during acceleration is not considered in estimation of the direction of travel in PDR. Therefore, in the preferred embodiment, such a peak is removed by the peak analysis processing.

When the power peak has been extracted in Step S53, the kicking leg at the time of detection of that power peak is specified from the kicking leg information 115 so that the thus specified kicking leg (whether the first leg or the second leg) is associated with that power peak as information related to that power peak (Step S54). In this manner, the peak analysis portion 106 generates peak information for estimation 116.

The peak information for estimation 116 generated by the peak analysis processing in this manner is information indicating the time at which the acceleration toward the direction of travel is estimated to be the maximum in its decreasing direction (the time at which the appropriate power peak has been detected), the value of the power PW at that time, the acceleration component $\alpha_E$ in E-axis direction at that time, the acceleration component $\alpha_N$ in N-axis direction at that time, and the kicking leg at that time.

The above is the description of the peak analysis processing in Step S29 in FIG. 6

Returning to FIG. 5, when an estimation timing has come in the normal state, the CPU 10 determines to be Yes in Step S8 and estimates the direction of travel of the pedestrian based on the peak information for estimation 116 (Step S9).

In Step S9, the direction of travel estimation portion 107 executes Equation 4 for each recorded peak based on the acceleration components $\alpha_E$ and $\alpha_N$ at that peak while referring to the peak information for estimation 116, thereby obtaining a phase angle θ with respect to E-axis at each peak.

[Equation 4]

$$\theta = \arctan \frac{-\alpha_N}{-\alpha_E} \quad \text{(Equation 4)}$$

Please note that the quadrant is determined by using the signs of the acceleration components $\alpha_N$ and $\alpha_E$.

The phase angle $\theta$ obtained by Equation 4 is the relative relationship between the direction of travel of the pedestrian and E-axis at that time. Therefore, the direction of travel estimation portion 107 records for each peak the phase angle $\theta$ as the direction of travel of the pedestrian at the kicking leg associated with that peak, as direction of travel information 117. That is, by execution of Step S9, every kicking leg between steps, the direction of travel is stored in the direction of travel information 117, in the form of the phase angle $\theta$ with respect to E-axis.

When Step S9 has been executed and the direction of travel information 117 has been updated, the acceleration information adjustment portion 108 performs adjustment processing (Step S10).

In the adjustment processing, the acceleration information adjustment portion 108 performs coordinate conversion for the acceleration information for detection 113 into an acceleration component $\alpha_f$ in the direction of travel and an acceleration component $\alpha_s$ which is directed rightward with respect to the direction of travel perpendicularly based on the direction of travel information 117, thereby generating adjusted acceleration information 118. Please note that it is not necessary to convert the vertical acceleration component $\alpha_U$ at this time.

The vertical acceleration component $\alpha_U$ and the acceleration component $\alpha_f$ in the direction of travel in the adjusted acceleration information 118 generated in Step S10 in this manner are shown in FIG. 4. That is, because the direction of travel has been estimated with high accuracy, the acceleration component $\alpha_f$ in the direction of travel is extracted with high accuracy and the walking movement of the pedestrian can be analyzed with high accuracy.

As described above, the terminal device 1 in the preferred embodiment forms a pedestrian observation system and includes: the acceleration sensor 14 which acquires acceleration information 140 in accordance with the uniquely defined terminal coordinate system accompanying a pedestrian; the horizontal direction detection portion 105 which obtains the power PW of the acceleration in the horizontal plane based on the acceleration component $\alpha_E$ in the east direction (first direction) perpendicular to the vertical direction and the acceleration component $\alpha_N$ in the north direction (second direction) perpendicular to the vertical direction and the east direction, that are obtained from the acceleration information 140 acquired by the acceleration sensor 14, thereby acquiring the time of observation of the maximum value of the power PW, the acceleration component $\alpha_E$ at the time of the observation of that maximum value of the power PW, and the acceleration component $\alpha_N$ at the time of observation of that maximum value of the power PW to acquire horizontal peak information; the vertical direction detection portion 104 which acquires the times of observation of maximum and minimum values of the acceleration in the vertical direction based on the acceleration information 140 acquired by the acceleration sensor 14 to acquire vertical peak information; the peak analysis portion 106 which chooses, based on the vertical peak information acquired by the vertical direction detection portion 104, information related to the maximum value of the power PW contained in the horizontal peak information acquired by the horizontal direction detection portion 105, to acquire peak information for estimation 116; and the direction of travel estimation portion 107 which acquires the traveling direction information 117 indicating the direction of travel of the pedestrian based on the peak information for estimation 116 acquired by the peak analysis portion 106. Thus, the calculation amount can be suppressed and therefore the direction of travel can be estimated with high accuracy and excellent responsiveness.

The terminal device 1 further includes: the posture estimation portion 100 which acquires posture information 111 indicating the posture of the terminal device 1 (acceleration sensor 14) with respect to an observation coordinate system suitable for observation of a walking movement of the pedestrian; the coordinate conversion portion 102 which performs, based on the posture information 111 acquired by the posture estimation portion 100, coordinate conversion for the acceleration information 140 acquired by the acceleration sensor 14 into the observation coordinate system to acquire converted acceleration information 112; and the LPF processing portion 103 which extracts a low frequency component from the converted acceleration information 112 acquired by the coordinate conversion portion 102 to acquire acceleration information for detection 113, wherein the horizontal direction detection portion 105 acquires the horizontal peak information based on the acceleration information for detection 113 acquired by the LPF processing portion 103, and the vertical direction detection portion 104 acquires the vertical peak information based on the acceleration information for detection 113 acquired by the LPF processing portion 103. Thus, even in a case where this system is applied to the terminal device 1 having a high freedom of posture, a noise that may be caused by rotation can be suppressed and the accuracy can be improved. That is, instead of estimation of the direction of travel by direct analysis of the acceleration information 140, the peak related to the acceleration is detected and the peak analysis processing is performed. Therefore, even when the pedestrian changes the manner of carrying the terminal device 1 instantaneously, estimation of the direction of travel cannot be affected by an instant change in the acceleration caused by that change of the carrying manner and therefore can be performed stably.

Moreover, the posture estimation portion 100 acquires the posture information 111 substantially in real time. Therefore, the responsiveness is further improved.

The vertical direction detection portion 104 acquires kicking leg information 105 related to the kicking leg of the pedestrian, and the peak analysis portion 106 associates information on the maximum value of the power PW contained in the peak information for estimation 116 and information for identifying the kicking leg with each other based on the kicking leg information 115 acquired by the vertical direction detection portion 104. Therefore, erroneous detection of the peak can be suppressed and the accuracy can be improved.

In the preferred embodiment, a case is described in which the terminal device 1 is not fixed to the pedestrian. In that case, it is necessary to estimate the posture of the terminal device 1 by using not only the acceleration sensor 14 but also the gyro sensor 15 and the magnetic sensor 16. However, in a case in which an application such as PDR is used, a terminal device for observing a walking movement of a pedestrian may be fixed to the body of the pedestrian. For example, the terminal device may be fixed to the waist of the pedestrian or put in the pedestrian's chest pocket. If the present invention is limited to such a use, the direction of travel can be estimated more easily than in the preferred embodiment.

Figure 11:
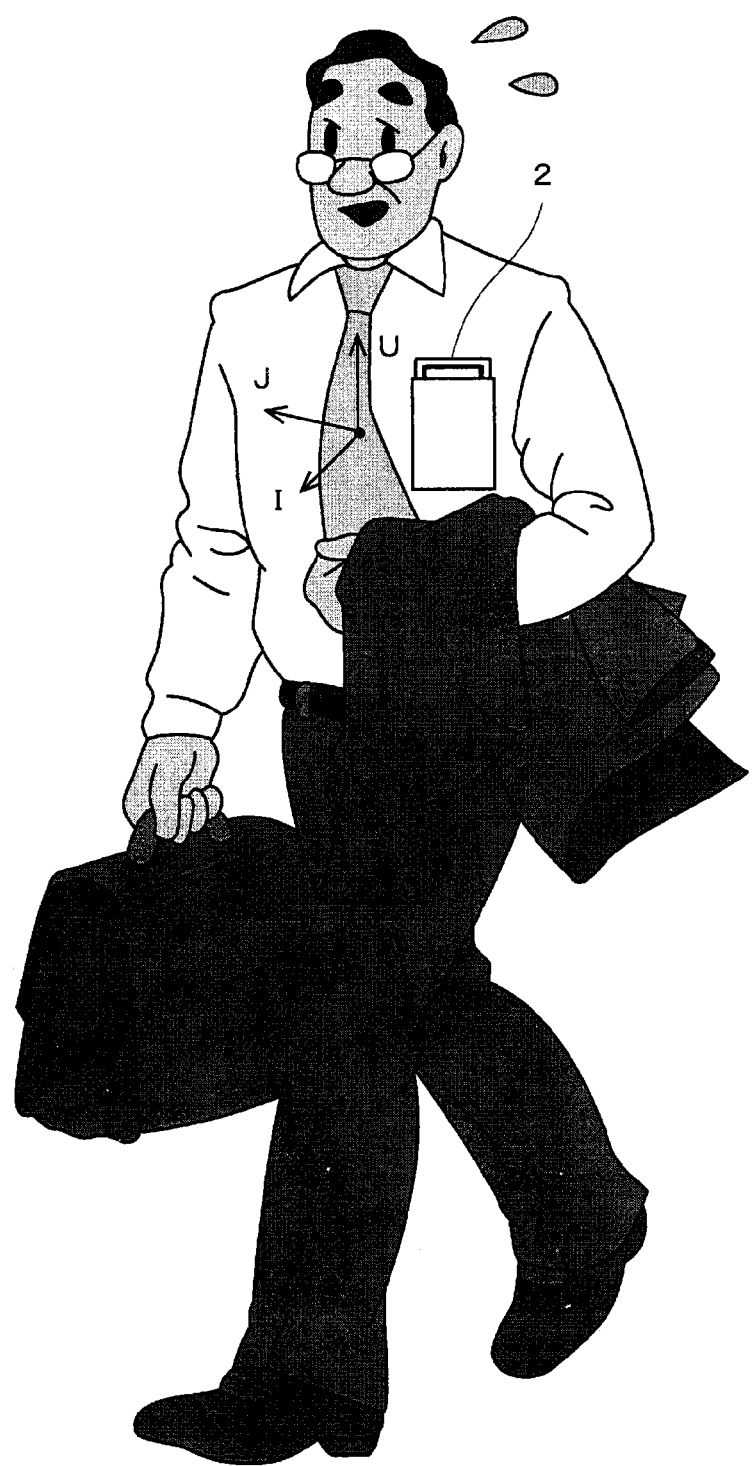
FIG. 11 shows a terminal device in another preferred embodiment of the present invention.

FIG. 11 shows a terminal device 2 in another preferred embodiment. It is assumed that the terminal device 2 shown in FIG. 11 measures the direction of travel while being put in the chest pocket of the pedestrian. The terminal device 2 forms a pedestrian observation system according to the present invention, like the terminal device 1.

In the other preferred embodiment, as the observation coordinate system suitable for observation of a walking movement of a pedestrian, a coordinate system is defined which has U-axis that is directed upward in the vertical direction, I-axis perpendicular to U-axis (axis directed forward of the pedestrian), and J-axis (axis directed rightward of the pedestrian) perpendicular to U-axis and I-axis. Hereinafter, this coordinate system is referred to as "IJU coordinate system." Thus, I-axis and J-axis are axes defined in the horizontal plane. The terminal coordinate system in the terminal device 2 is assumed to be the same as that of the terminal device 1.

Unlike ENU coordinate system in the aforementioned preferred embodiment, IJU coordinate system is not independent of the pedestrian's movement. IJU coordinate system changes its orientation in accordance with the movement of the pedestrian.

While the pedestrian brings the terminal device 2 therewith, however, the relative relationship between IJU coordinate system and the terminal coordinate system (XYZ coordinate system) does not change. Moreover, the relative relationship between IJU coordinate system and XYZ coordinate system in a case where the terminal device 2 is put in the chest pocket as in the other preferred embodiment can be acquired in advance and stored in the terminal device 2.

By conversion of the acceleration information 140 to the converted acceleration information 112 by means of the same structure as the coordinate conversion portion 102 in the aforementioned preferred embodiment by using that relative relationship, the direction of travel can be estimated in the same manner as that in the aforementioned preferred embodiment. In the following description, the details of the other preferred embodiment are omitted.

As described above, in the terminal device 2 in the other preferred embodiment, the same effects as those obtained in the aforementioned preferred embodiment can be also obtained.

Moreover, by fixing the terminal device 2 to the body of the pedestrian and using IJU coordinate system defined with respect to the body of the pedestrian as the observation coordinate system, it is not necessary to estimate the posture constantly. Therefore, the direction of travel can be estimated with a simple structure and a small calculation amount.

The terminal device 2 may be fixed to the waist of the pedestrian or the like with a holder or the like. That is, the terminal device 2 may be fixed to any position, as long as the relative relationship between the terminal coordinate system and the observation coordinate system (IJU coordinate system in this preferred embodiment) is fixed.

It has been described that the relative relationship between IJU coordinate system and XYZ coordinate system is acquired in advance and stored in the terminal device 2 in the other preferred embodiment. However, the system may be configured such that at first the posture may be estimated only once in the same manner as that in the aforementioned preferred embodiment and saved to be used thereafter. In this case, although the terminal device 2 has to include a structure corresponding to the gyro sensor 15 and the magnetic sensor 16, calculation and measurement for estimating the posture are performed only once and therefore the calculation burden is suppressed and the responsiveness is improved.

It can be determined whether or not the terminal device 2 (acceleration sensor 14) is approximately fixed to the body of the pedestrian, based on various situations. For example, the pedestrian may operate the operation portion 12 in advance to input such a situation into the terminal device 2. Alternatively, by providing a camera in the terminal device 2, capturing an image of surroundings with the camera, and analyzing the captured image information, the determination can be made from the brightness in the surroundings, the movement of the subject, or the like. When the terminal device 2 is put in the chest pocket, the holder, or the like, a phenomenon such as dark surroundings, or almost no movement of the subject (the inside of the pocket or the holder) is detected.

In the other preferred embodiment, an example has been described in which the terminal device 2 (acceleration sensor 14) is approximately fixed to the body of the pedestrian. However, in some situations where PDR is used, a state may occur relatively frequently in which the pedestrian is walking while holding a portable device onto the arm thereof and swinging that arm back and forth (hereinafter, this state is referred to as an "arm-swinging state"). It should be noted that the term "arm" refers to a body part from a shoulder to a top of a finer and includes a "hand" and a "finger," for example. That is, the form of "holding the device onto the arm" includes a state in which the device is grasped by a hand, a state in which the device is put on a finger, a state in which put on a "wrist" with a belt like a watch-like device, and a state in which the device has a bracelet-like shape and is put around an "upper arm," for example.

Figure 12:
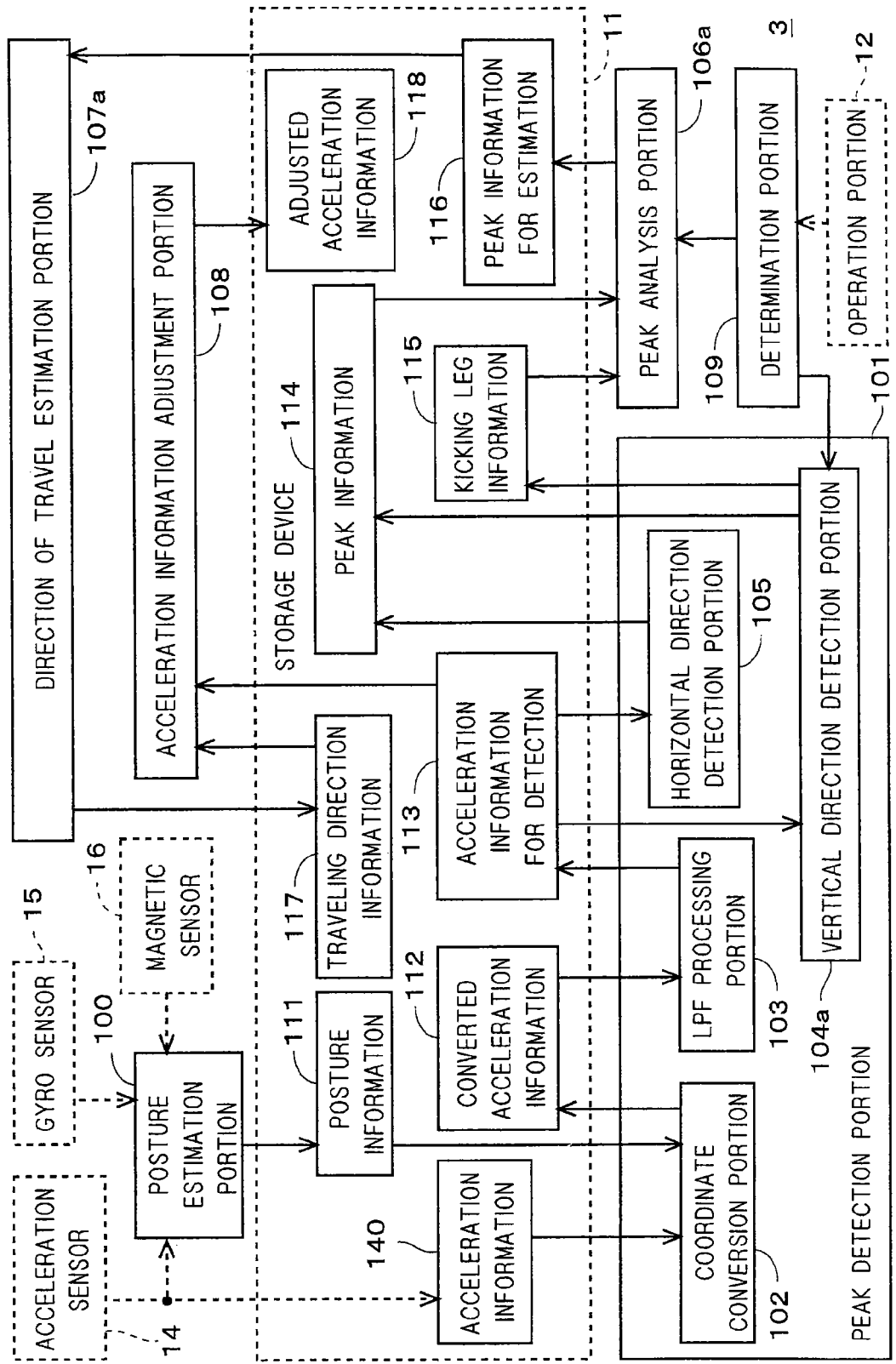
FIG. 12 shows functional blocks provided in a terminal device in a still another preferred embodiment of the present invention, together with a data flow.

FIG. 12 shows functional blocks included in a terminal device 3 in a still another preferred embodiment, together with a data flow. In the following description, for the terminal device 3, the same components as those in the terminal device 1 are labeled with the same reference numerals and the description thereof is omitted as appropriate.

The terminal device 3 is different from the terminal device 1 in that the terminal device 3 includes a vertical direction detection portion 104a, a peak analysis portion 106a, and a direction of travel estimation portion 107a in place of the vertical direction detection portion 104, the peak analysis portion 106, and the direction of travel estimation portion 107, respectively, and further includes a determination portion 109.

The determination portion 109 has a function of determining whether or not the pedestrian is walking while swinging the arm onto which the terminal device 3 (acceleration sensor 14) is held back and forth. That is, the determination portion 109 determines whether or not the pedestrian is in the arm-swinging state.

The determination portion 109 of the terminal device 3 performs determination of the arm-swinging state in response to an input signal from the operation portion 12. More specifically, the pedestrian inputs information on whether or not the pedestrian is in the arm-swinging state by operating the operation portion 12, and that input is transmitted to the determination portion 109.

Information to which the determination portion 109 refers for the determination of the arm-swinging state is not limited to the information transmitted from the operation portion 12. For example, the determination portion 109 may refer to the acceleration information for detection 113, compare the period of the vertical acceleration component and the horizontal acceleration component with each other, and analyze them, to determine the arm-swinging state.

In the arm-swinging state, the maximum value of the power PW tends to be larger. Therefore, the terminal device 3 may be configured such that the determination portion 109 refers to the peak information 114, compares the power PW in the horizontal direction contained in the peak information 114 (only the maximum value of the power PW is stored in the peak information 114) with a threshold value, and determines that the current state is the arm-swinging state when the power PW is larger than that threshold value. As this threshold value, 0.5 [G] (G is gravitational acceleration) can be used, for example. However, this threshold value is not limited thereto.

Alternatively, a camera may be provided in the terminal device 3 so that an image of the surroundings is taken by that camera and the determination portion 109 analyzes the taken image information. In the thus taken image, the arm-swinging state can be determined based on whether or not a phenomenon unique to the arm-swinging state has been detected.

The determination portion 109 transmits the determination result (information indicating whether or not the current state is the arm-swinging state) to the vertical direction detection portion 104a and the peak analysis portion 106a.

The vertical direction detection portion 104a has a function of generating the peak information 114 and the kicking leg information 115, like the vertical direction detection portion 104. However, the vertical direction detection portion 104a is different from the vertical direction detection portion 104 in that prior to generation of the peak information 114 and the kicking leg information 115, the vertical direction detection portion 104a refers to the determination result transmitted from the determination portion 109.

In a case where the walking movement of the pedestrian is not in the arm-swinging state, the vertical direction detection portion 104a performs the same processing as the vertical direction detection portion 104 to generate the peak information 114 and the kicking leg information 115. That is, in a case where the determination portion 109 has determined that the walking movement is not in the arm-swinging state, the peak information 114 and the kicking leg information 115 generated in the terminal device 3 are the same as those generated in the terminal device 1.

On the other hand, in a case where the determination portion 109 has determined that the walking movement is in the arm-swinging state, the vertical direction detection portion 104a adopts processing different from that of the vertical direction detection portion 104 to generate the peak information 114. Moreover, in this case, the vertical direction detection portion 104a does not generate the kicking leg information 115.

The details of the processing executed by the vertical direction detection portion 104a of the terminal device 3 when the walking movement is in the arm-swinging state will be described later.

The peak analysis portion 106a has a function of generating the peak information for estimation 116, like the peak analysis portion 106. However, the peak analysis portion 106a is different from the peak analysis portion 106 in that prior to generation of the peak information for estimation 116 the peak analysis portion 106a refers to the determination result transmitted from the determination portion 109.

In a case where the walking movement of the pedestrian is not in the arm-swinging state, the peak analysis portion 106a performs the same peak analysis processing as that performed by the peak analysis portion 106 to generate the peak information for estimation 116. That is, in the case where the walking movement has been determined not to be in the arm-swinging state by the determination portion 109, the peak information for estimation 116 generated in the terminal device 3 is the same as that generated in the terminal device 1.

On the other hand, in the case where the walking movement has been determined to be in the arm-swinging state by the determination portion 109, the peak analysis portion 106a adopts different processing from that of the peak analysis portion 106 to generate the peak information for estimation 116. That is, in the arm-swinging state, the peak analysis portion 106a applies analysis processing specialized in the arm-swinging state. Therefore, in the terminal device 3, estimation accuracy of the direction of travel in the arm-swinging state can be improved.

The details of the analysis processing executed by the peak analysis portion 106a of the terminal device 3 in the arm-swinging state will be described later.

Like the direction of travel estimation portion 107, the direction of travel estimation portion 107a has a function of estimating the direction of travel of the pedestrian based on the peak information for estimation 116, to generate the direction of travel information 117. However, the direction of travel estimation portion 107a is different from the direction of travel estimation portion 107 in that prior to generation of the traveling direction information 117 the direction of travel estimation portion 107a determines whether or not two minimum values of the vertical acceleration component $\alpha_U$ are contained in the peak information for estimation 116.

In a case where no minimum value of the vertical acceleration component $\alpha_U$ is contained in the peak information for estimation 116, the direction of travel estimation portion 107a obtains the direction of travel by the same calculation (Equation 4) as the direction of travel estimation portion 107 to generate the traveling direction information 117.

On the other hand, in a case where two minimum values of the vertical acceleration component $\alpha_U$ are contained in the peak information for estimation 116, the direction of travel estimation portion 107a obtains the direction of travel by using an appropriate one of equations calculating the direction of travel in accordance with the magnitude relation between the minimum values.

The case where two minimum values of the vertical acceleration component $\alpha_U$ are contained in the peak information for estimation 116 in the terminal device 3 is a case where the determination portion 109 has determined that the walking movement is in the arm-swinging state. In other words, the direction of travel estimation portion 107a determines whether or not the walking movement is in the arm-swinging state based on whether or not two minimum values of the vertical acceleration component $\alpha_U$ are contained. Then, when the walking movement is not in the arm-swinging state, the direction of travel estimation portion 107a performs the same processing as the direction of travel estimation portion 107. The details of the processing for obtaining the direction of travel by the direction of travel estimation portion 107a will be described later.

In the above, the structure and functions of the terminal device 3 have been described. Next, a method for estimating the direction of travel of the pedestrian by using the terminal device 3 is described.

Figure 13:
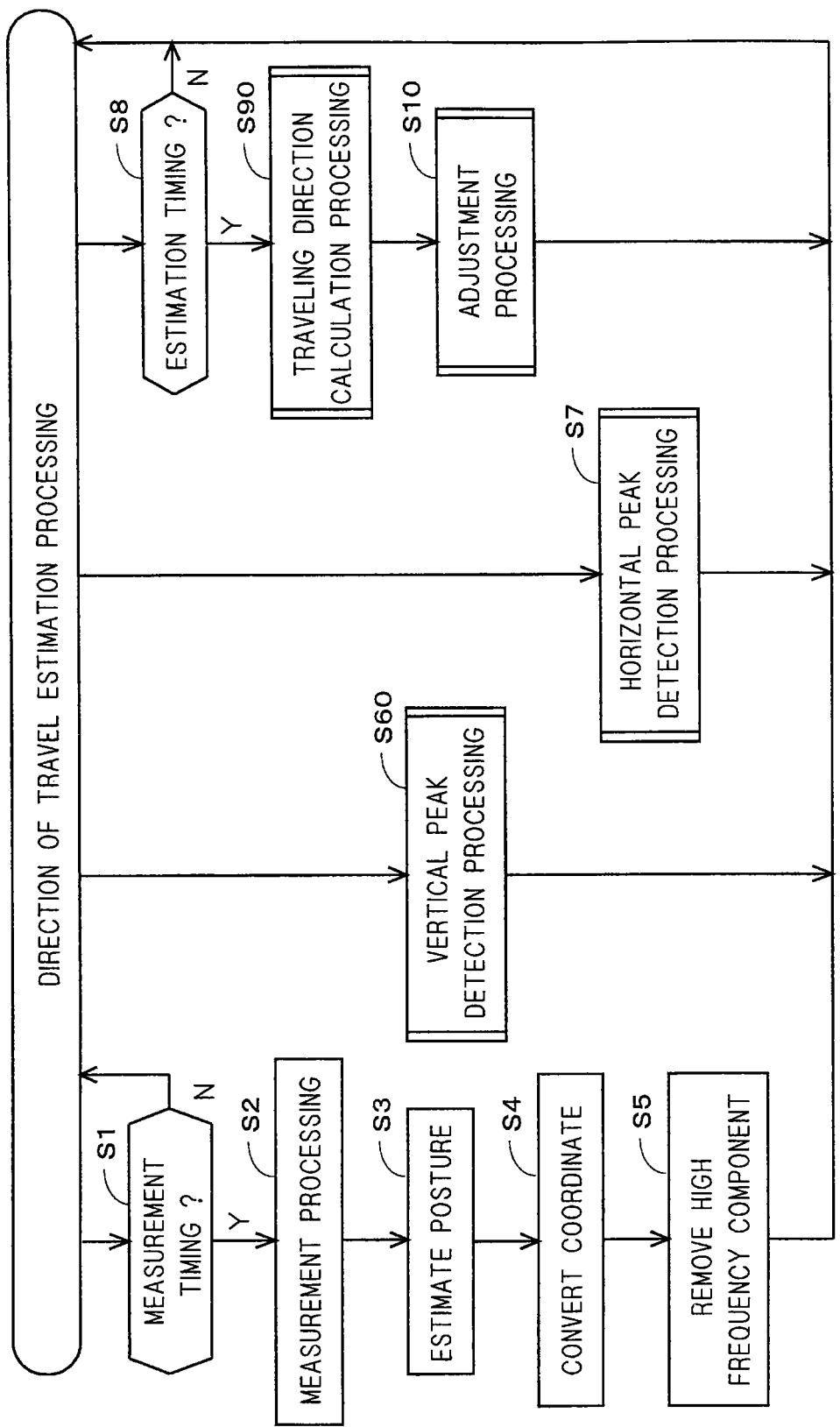
FIG. 13 is a flowchart of processing for estimating a direction of travel in the terminal device in the still other preferred embodiment.

FIG. 13 is a flowchart of the direction of travel estimation processing of the terminal device 3 in the still other preferred embodiment. The direction of travel estimation processing in the terminal device 3 is different from that (FIG. 5) of the terminal device 1 in that Step S60 is executed in place of Step S6 and Step S90 is executed in place of Step S9. Steps S60 to S90 are described below.

Figure 14:
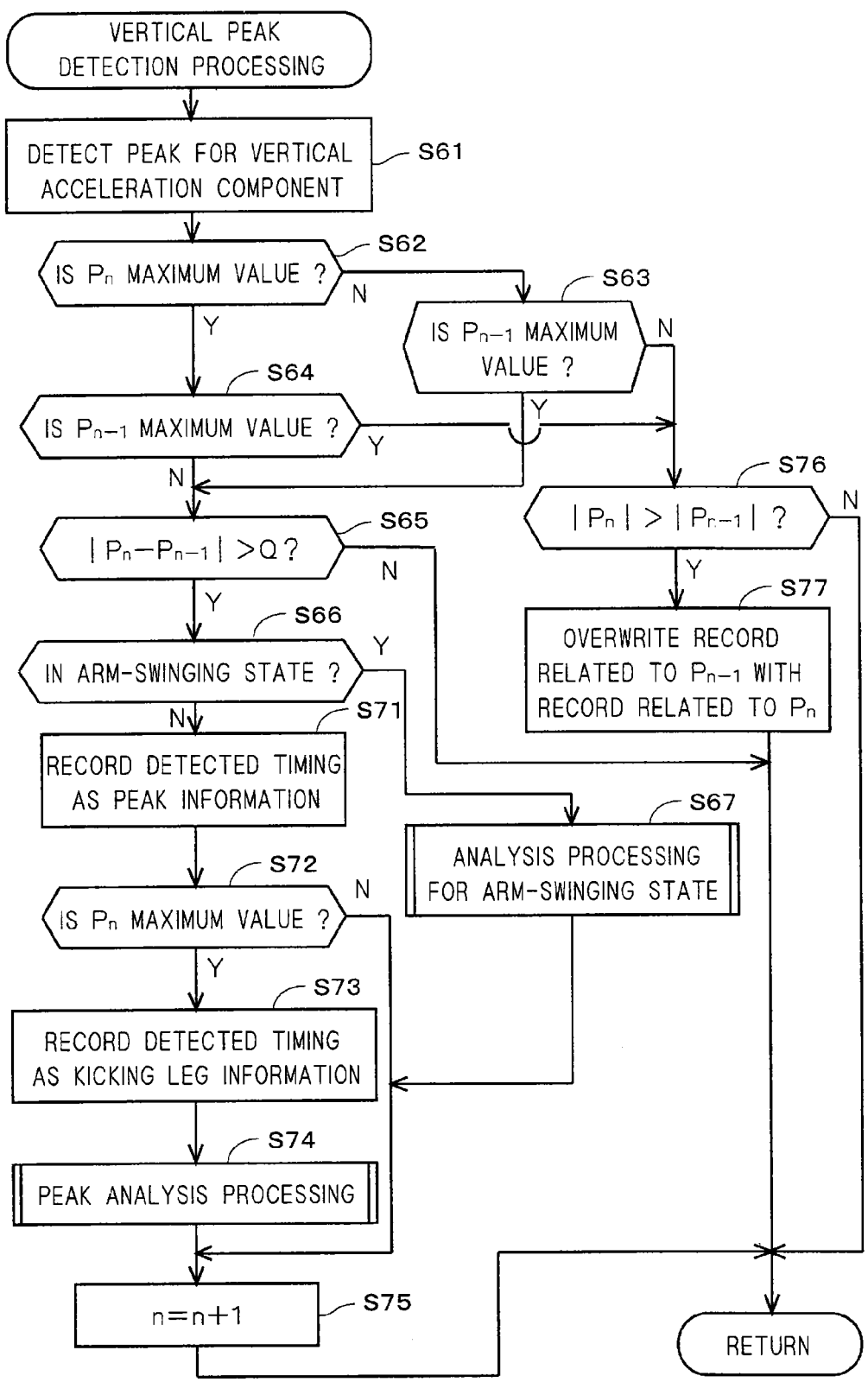
FIG. 14 is a flowchart of vertical peak detection processing executed by the terminal device in the still other preferred embodiment.

FIG. 14 is a flowchart of the vertical peak detection processing (Step S60) executed by the terminal device 3 in the still other preferred embodiment. Steps S61 to S65 are executed in the same manner as Steps S21 to S25 already described in FIG. 6 and therefore the description thereof is omitted here. Also, Steps S71 to S77 shown in FIG. 14 are executed in the same manner as Steps S26 to S32 already described in FIG. 6 and therefore the description thereof is omitted.

When the determination result in Step S65 is Yes, the vertical direction detection portion 104a determines whether or not the current state is the arm-swinging state (Step S66). Please note that Step S65 is processing that is executed when the maximum value and the minimum value have been alternately detected in the vertical acceleration component au, as in the case of the terminal device 1. In Step S66, the vertical direction detection portion 104a determines whether or not the current state is the arm-swinging state based on the determination result transmitted from the determination portion 109.

When the determination result in Step S66 is No (the current state is not the arm-swinging state), the terminal device 3 executes processing from Steps S71 to S75, ends the vertical peak detection processing (Step S60), and goes back to the direction of travel estimation processing in FIG. 13. In this manner, when the walking movement is not in the arm-swinging state, the terminal device 3 executes the same processing as Steps S26 to S30 in the terminal device 1 to generate the peak information 114, the kicking leg information 115, and the peak information for estimation 116.

On the other hand, when the determination result in Step S66 is Yes (the walking movement is in the arm-swinging state), the terminal device 3 executes analysis processing for the arm-swinging state (Step S67). That is, the analysis processing for the arm-swinging state is one executed only when it has been determined that the pedestrian is walking while holding the portable device onto the arm thereof and swinging that arm back and forth (i.e., the pedestrian is in the arm-swinging state).

Figure 15:
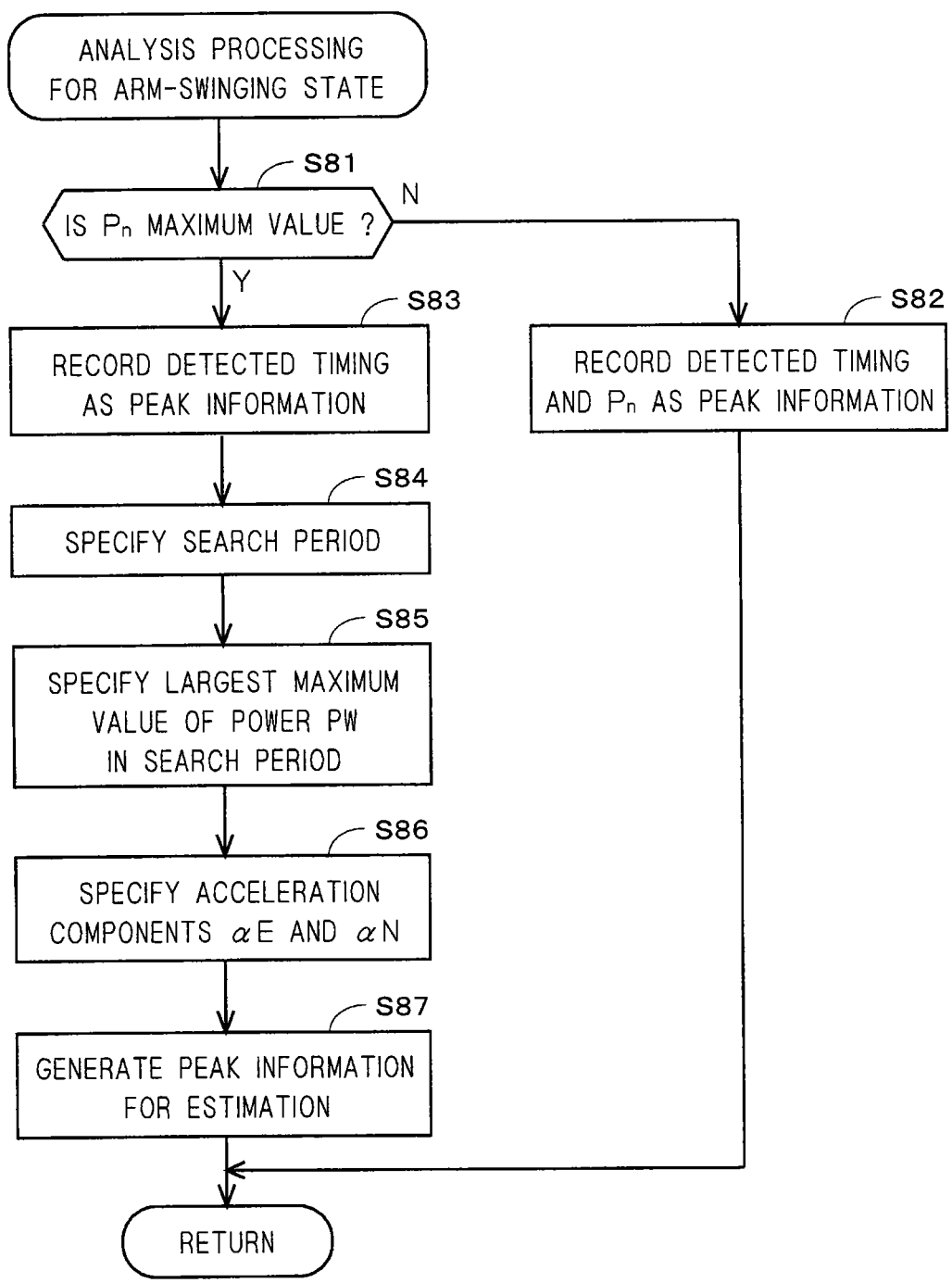
FIG. 15 is a flowchart of analysis processing for an arm-swinging state in the terminal device in the still other preferred embodiment.

FIG. 15 is a flowchart of the analysis processing for the arm-swinging state of the terminal device 3 in the still other preferred embodiment.

When the analysis processing for the arm-swinging state has started, the vertical direction detection portion 104a determines whether or not the peak $P_n$ of the vertical acceleration component $\alpha_U$ detected in Step S61 is the maximum value (Step S81). As described above, the peak $P_n$ detected in Step S61 is the maximum value of the vertical acceleration component $\alpha_U$ in some cases and is the minimum values in other cases.

When the peak $P_n$ detected in Step S61 is the minimum value (No in Step S81), the timing at which that peak $P_n$ has been detected (i.e., "$T_{min}$") and the peak $P_n$ (i.e., the minimum value of the vertical acceleration component $\alpha_U$) are stored as the peak information 114 (Step S82).

Figure 16:
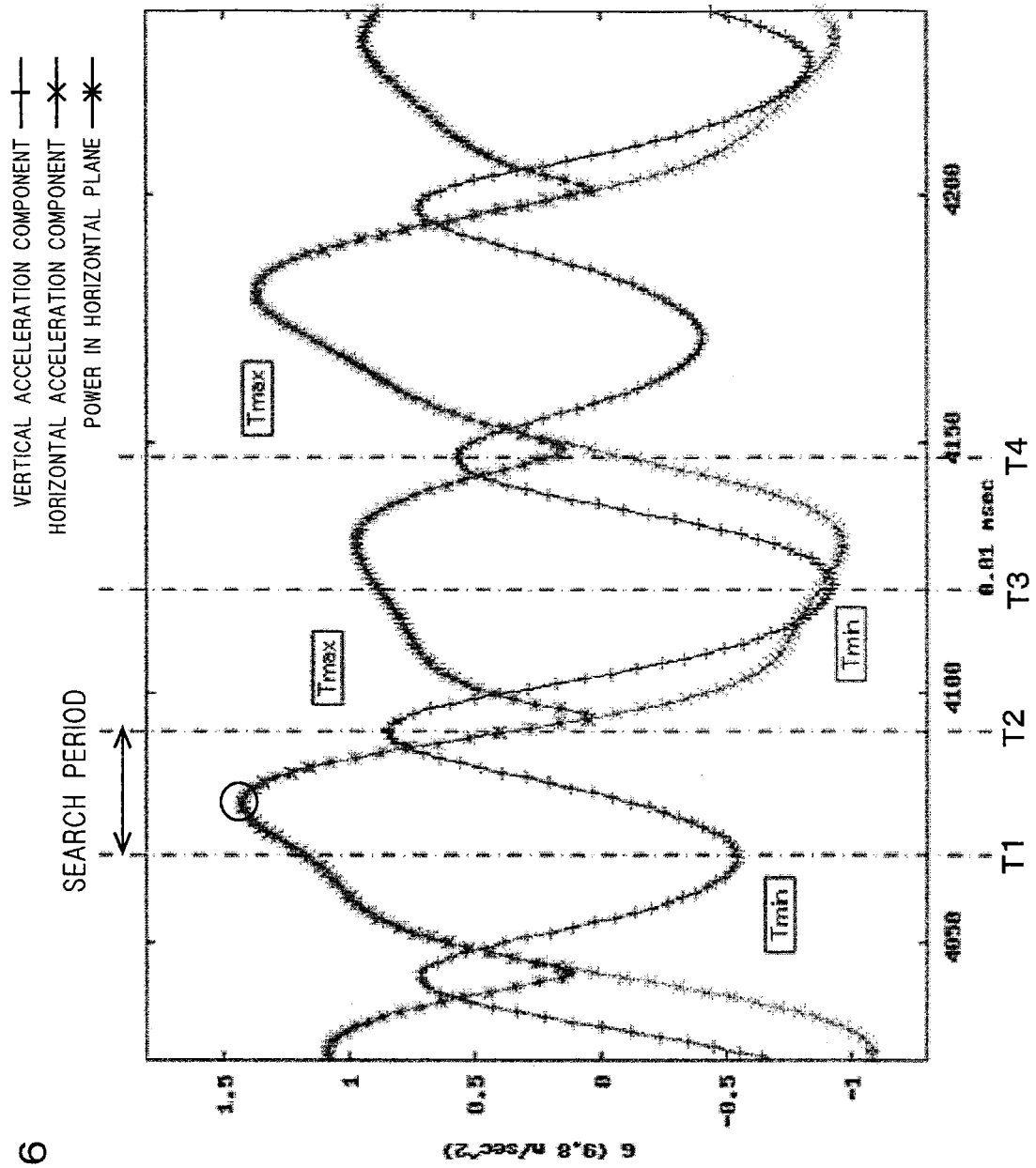
FIG. 16 exemplifies an acceleration component change in the arm-swinging state.

FIG. 16 shows exemplary changes of the acceleration components in the arm-swinging state. FIG. 16 shows vertical acceleration component au, the acceleration component of in the direction of travel, and the power PW in the horizontal plane.

The analysis processing for the arm-swinging state is executed at the time of detection of the maximum value or the minimum value of the vertical acceleration component $\alpha_U$. Therefore, in the example of FIG. 16, this processing is executed at times T1, T2, T3, and T4.

When time T3 is considered as an example, time T3 is the time of observation of the minimum value of the vertical acceleration component au and therefore the peak $P_n$ at that time is the minimum value. Thus, in this case, the determination result in Step S81 is No, and time T3 (timing of detection) and the peak $P_n$ (the value of the vertical acceleration component $\alpha_U$ at time T3) are recorded as the peak information 114.

When having executed Step S82, the terminal device 3 ends the analysis processing for the arm-swinging state. When having ended the analysis processing for the arm-swinging state, the terminal device 3 executes Step S75, ends the vertical peak detection processing (Step S60), and goes back to the direction of travel estimation processing shown in FIG. 13.

On the other hand, when the peak $P_n$ detected in Step S61 is the maximum value (Yes in Step S81), the timing of detection of that peak $P_n$ (i.e., "$T_{max}$") is stored as the peak information 114 (Step S83).

In the example of FIG. 16, when time T4 is considered as an example, the peak $P_n$ at that time is the maximum value because time T4 is the time of observation of the maximum value of the vertical acceleration component au. Therefore, in this case, the determination result in Step S81 is Yes, and the timing of detection of the peak $P_n$ (i.e., time T4) is recorded as the peak information 114. In other words, when the peak $P_n$ is the maximum value, that peak $P_n$ is not recorded as the peak information 114. This is simply because the maximum value of the vertical acceleration component $\alpha_U$ is not used in the processing executed later.

When having executed Step S83, the peak analysis portion 106a refers to the peak information 114 and specifies the search period (Step S84). In Step S84, the peak analysis portion 106a specifies newest two times each of which is the time of detection of the minimum value of the vertical acceleration component $\alpha_U$ (i.e., "$T_{min}$"). Then, the peak analysis portion 106a specifies the time of detection of the maximum value of the vertical acceleration component $\alpha_U$ (i.e., "$T_{max}$") located between the thus specified two times $T_{min}$. Finally, the peak analysis portion 106a specifies the period from the older $T_{min}$ to the thus specified $T_{max}$ as the search period.

Because Step S84 is executed when the peak $P_n$ is the maximum value, the description is made for time T4 as an example in the example of FIG. 16. In this case, the latest two $T_{min}$ to be specified retrospectively are times T1 and T3, $T_{max}$ between them is time T2, and the older one of the latest two $T_{min}$ is time T1. Therefore, the search period specified by execution of Step S84 at time T4 is a period from time T1 to time T2, as shown in FIG. 16.

When the search period has been specified, the peak analysis portion 106a specifies the largest one of the maximum values of the power PW in the search period (Step S85). That is, the peak analysis portion 106a detects the maximum value (s) of the power PW within the search period and, in a case where there are two or more maximum values of the power PW in the search period, specifies the largest one of them.

Then, the time of the maximum value specified in Step S85 is specified, and the acceleration component $\alpha_E$ in the east direction (first direction) at that time and the acceleration component $\alpha_N$ in the north direction (second direction) at that time are specified (Step S86).

Then, peak information for estimation 116 is generated to contain the specified acceleration components $\alpha_E$ and $\alpha_N$ and the minimum values at the two $T_{min}$ specified in Step S84 (Step S87). That is, the specified acceleration components $\alpha_E$ and $\alpha_N$ and the peaks $P_{n-3}$ and $P_{n-1}$ that are the minimum values are associated with each other, and are stored as the peak information for estimation 116.

In a case where two $T_{min}$ cannot be detected in Step S84, the peak analysis portion 106a stores dummy information (a value recognized as dummy information) as the peak $P_{n-3}$ and $P_{n-1}$ that are the minimum values to be stored in the peak information for estimation 116. The reason for this is as follows. The direction of travel estimation portion 107a in the still other preferred embodiment makes determination of the arm-swinging state based on whether or not two minimum values of the vertical acceleration component $\alpha_U$ are contained, as described above. Thus, even in the arm-swinging state, the detection result may indicate that the current state is not the arm-swinging state. For preventing such erroneous determination, the dummy information is stored. Although the details are omitted in the following description, when dummy information is stored as two minimum values in the peak information for estimation 116, the direction of travel estimation portion 107a determines that the current state is the arm-swinging state in Step S91 (FIG. 17) described later but, without performing new estimate of the direction of travel, keeps the direction of travel already estimated.

When having executed Step S87, the terminal device 3 ends the analysis processing for the arm-swinging state. When having ended the analysis processing for the arm-swinging state, the terminal device 3 performs Step S75, ends the vertical peak detection processing (Step S60), and goes back to the direction of travel estimation processing shown in FIG. 13.

In the arm-swinging state, an imbalance occurs in effects of vertical motion of the terminal device 3 caused by the walking movement. This imbalance remarkably appears for the minimum values of the vertical acceleration component $\alpha_U$. As is apparent from observation of FIG. 16, the minimum values of the vertical acceleration component $\alpha_U$ in the arm-swinging state alternately have a relatively large value and a relatively small value. Moreover, a peak of the acceleration component $\alpha_f$ in the direction of travel occurs between the minimum value and the maximum value of the vertical acceleration component $\alpha_U$ and the phase of each peak has strong correlation with the magnitude relation of the minimum values of the vertical acceleration component. The terminal device 3 uses those features observed in the arm-swinging state for estimating the direction of travel with higher accuracy.

The above is the description of the vertical peak detection processing (Step S60). Next, traveling direction calculation processing (Step S90 in FIG. 13) is described.

Figure 17:
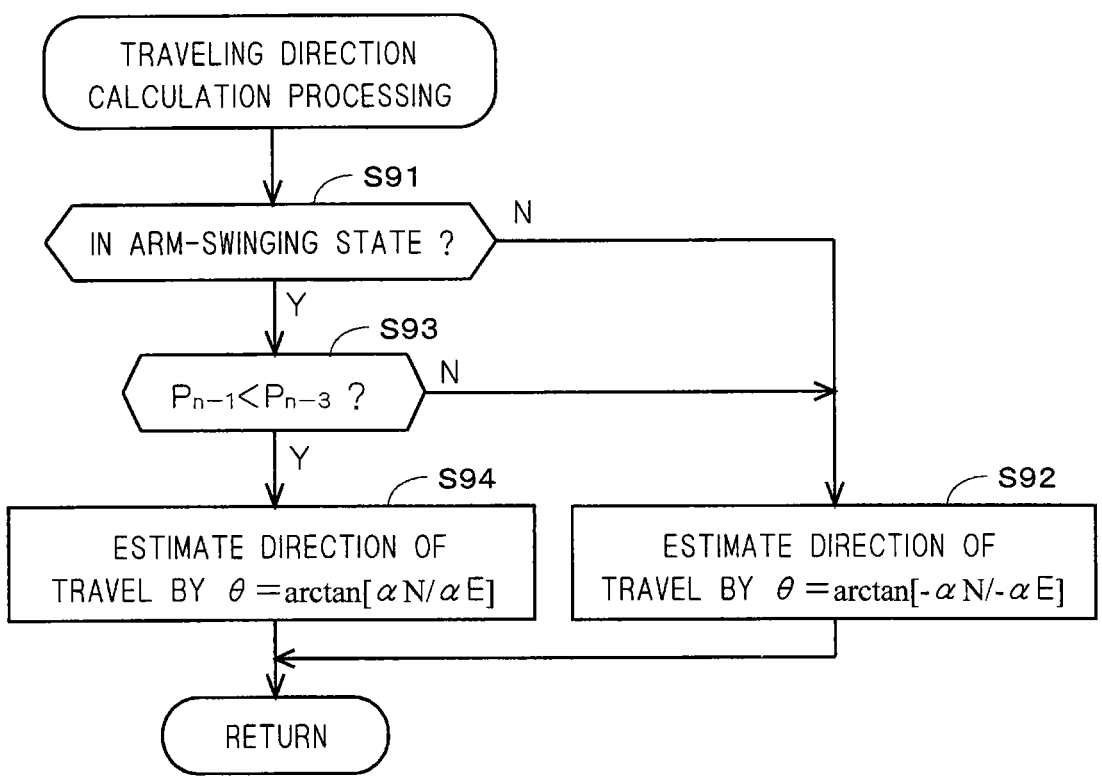
FIG. 17 is a flowchart of traveling direction calculation processing of the terminal device in the still other preferred embodiment of the present invention.

FIG. 17 is a flowchart of the traveling direction calculation processing of the terminal device 3 in the still other preferred embodiment. The traveling direction calculation processing is executed in a case where the determination result in Step S8 shown in FIG. 13 is Yes.

When the traveling direction calculation processing has been started, the direction of travel estimation portion 107a determines whether or not the walking movement of the pedestrian is in the arm-swinging state (Step S91). The direction of travel estimation portion 107a refers to the peak information for estimation 116 and performs determination of the arm-swinging state based on whether or not the peaks $P_{n-3}$ and $P_{n-1}$ that are the minimum values of the vertical acceleration component $\alpha_U$ are contained in that peak information for estimation 116. This is because, if the walking movement is not in the arm-swinging state, Step S87 is not executed and the value of the vertical acceleration component $\alpha_U$ is not contained in the peak information for estimation 116. However, the determination result may be directly transmitted from the determination portion 109 to the direction of travel estimation portion 107a before execution of Step S91, for example.

When the walking movement is not is the arm-swinging state (No in Step S91), the direction of travel estimation portion 107a calculates $$\theta = \arctan \frac{-\alpha_N}{-\alpha_E},$$

i.e., Equation 4 based on the acceleration components $\alpha_E$ and $\alpha_N$ recorded in the peak information for estimation 116, thereby obtaining the phase θ. Thus, the direction of travel of the pedestrian is estimated (Step S92). As described above, the direction of travel estimation portion 107a estimates the direction of travel of the pedestrian in the same manner as the direction of travel estimation portion 107 when the walking movement is not in the arm-swinging state.

When the walking movement is in the arm-swinging state (Yes in Step S91), the direction of travel estimation portion 107a further confirms the magnitude relation between the peaks $P_{n-3}$ and $P_{n-1}$ stored in the peak information for estimation 116. That is, the direction of travel estimation portion 107a determines whether or not the new one $P_{n-1}$ of the two peaks $P_{n-3}$ and $P_{n-1}$ in the chronological order is smaller than the old one $P_{n-3}$ (Step S93).

When $P_{n-1} < P_{n-3}$ is not satisfied (No in Step S93), the direction of travel estimation portion 107a estimates the direction of travel by Step S92.

It can be estimated that the acceleration components $\alpha_E$ and $\alpha_N$ recorded in association with those two peaks $P_{n-3}$ and $P_{n-1}$ when the determination result in Step S93 is No have been recorded while the pedestrian swings the arm holding the terminal device 3 from back to front in the direction of travel. Therefore, in this case, the direction of travel estimation portion 107a obtains the phase 9 by Equation 4.

On the other hand, when $P_{n-1} < P_{n-3}$ is satisfied (Yes in Step S93), the direction of travel estimation portion 107a estimates the direction of travel by the following Equation 5.

[Equation 5]

$$\theta = \arctan \frac{\alpha_N}{\alpha_E} \quad \text{(Equation 5)}$$

It can be estimated that the acceleration components $\alpha_E$ and $\alpha_N$ recorded in association with those two peaks $P_{n-3}$ and $P_{n-1}$ when the determination result in Step S93 is Yes have been recorded while the pedestrian swings the arm holding the terminal device 3 from front to back in the direction of travel. Therefore, in this case, the direction of travel estimation portion 107a obtains the phase θ by Equation 5.

When having executed Step S92 or S94, the terminal device 3 ends the traveling direction calculation processing (Step S90) and goes back to the processing shown in FIG. 13.

As described above, the terminal device 3 further includes the determination portion 109 which determines whether or not the pedestrian is walking while swinging the arm thereof that carries the terminal device 3 (acceleration sensor 14) back and forth, wherein, when it has been determined by the determination portion 109 that the pedestrian is walking while swinging the arm thereof carrying the acceleration sensor 14 back and forth, the vertical direction detection portion 104a acquires the minimum value of the acceleration in the vertical direction as the peak information 114 based on the acceleration information 140 acquired by the acceleration sensor 14, and the peak analysis portion 106a acquires the peak information for estimation 116 in accordance with the determination result by the determination portion 109.

Thus, while the walking movement is not in the arm-swinging state, the terminal device 3 can obtain the same effects as those obtained by the terminal device 1 by estimating the direction of travel of the pedestrian in the same manner as the terminal device 1.

On the other hand, while the walking movement is in the arm-swinging state, the terminal device 3 can estimate the direction of travel with higher accuracy by estimating the direction of travel of the pedestrian, considering the phenomenon or feature unique to the arm-swinging state. More specifically, the terminal device 3 can specify the search period in the arm-swinging state and distinguish the swinging of the arm holding the terminal device 3 from front to back and the swinging from back to front from each other, thereby estimating the direction of travel.

The present invention is not limited to the preferred embodiments described above, but can be further modified.

For example, each step shown in the above preferred embodiments is merely an example, but is not limited to the order and contents described above. As long as the same effects can be obtained, the order and/or contents can be changed.

Moreover, in the terminal devices 1 and 2, the phase angle θ for each step is used as the traveling direction information 117, so that the adjusted acceleration information 118 is generated. However, a human walking movement can be analyzed by using a period in which right and left legs are kicked out (i.e., a period for two steps) as a reference. That is, the direction of travel during a period in which each of the first and second legs is kicked once may be used as the traveling direction information 117. In this case, the traveling direction information 117 may be generated by using an intermediate angle between the respective phase angles θ for the successive two steps as the direction of travel between the two steps, for example. Alternatively, for each of the successive two steps a moving vector may be obtained based on the value of the power PW and the phase angle θ at that time, a direction of travel vector may be determined by vector synthesis of those two moving vectors, and the orientation of that direction of travel vector may use as the traveling direction information 117.

In the above preferred embodiment, it has been described that, when the terminal devices 1, 2, and 3 have been started, the measurement timing and the estimation timing are monitored. However, the terminal device 1 does not have to always continue to estimate the direction of travel. For example, the terminal device 1 may be configured to monitor those timings only when a need of estimation of the direction of travel occurs (e.g., while an application related to PDS is activated).

In the above preferred embodiment, exemplary pedestrian observation systems each formed only by the terminal device 1, 2, or 3 has been described. That is, examples have been described in which the pedestrian observation system is configured by one device. However, the acceleration information 140, the angular velocity information 150, and the terrestrial magnetism information 160 may be acquired by the terminal device accompanying the pedestrian while calculation of the direction of travel may be performed by an external computer or the like. For example, a pedestrian observation system may be configured by a terminal device including the acceleration sensor 14 and a server device that can perform data communication with that terminal device, wherein functional blocks corresponding to the vertical direction detection portion 104 and the horizontal direction detection portion 105, for example, are provided in that server device.

In any of the above preferred embodiments, an example has been described in which the peak information 114 and the kicking leg information 115 are generated based on the acceleration information for detection 113 by the vertical direction detection portion 104 and the horizontal direction detection portion 105. That is, in any of the aforementioned embodiments, the peak analysis portion 106 generates the peak information for estimation 116 based on the peak information 114 and the kicking leg information 115. However, only by performing coordinate conversion for the acceleration information 140 based on the posture information 111 to generate the converted acceleration information 112 prior to the processing of high frequency component removal by the LPF processing portion 103, effects of rotation can be suppressed more, as compared with conventional techniques, so that the detection accuracy in PDR can be improved.

Moreover, the timing at which the peak analysis processing (Step S29) is executed has been described as the timing of detection of the maximum value in the vertical direction in the vertical peak processing (Step S6). However, it is not always necessary to execute the peak analysis processing at that timing. That is, the peak analysis processing may be executed at any time before a need of estimation of the direction of travel newly occurs.

While the invention has been shown and described in detail, the foregoing description is in all aspects illustrative and not restrictive. It is therefore understood that numerous modifications and variations can be devised without departing from the scope of the invention. The scope of the present invention is shown by claims.

What is claimed is:

1. A pedestrian observation system comprising:
   an acceleration detection element configured to acquire acceleration information in accordance with a terminal coordinate system that accompanies a pedestrian and is defined uniquely;
   a horizontal direction detection element configured to obtain a power of an acceleration in a horizontal plane based on an acceleration component in a first direction perpendicular to a vertical direction and an acceleration component in a second direction perpendicular to the vertical direction and the first direction, that are obtained from the acceleration information acquired by the acceleration detection element, thereby acquiring a time of observation of a maximum value of the power, an acceleration component in the first direction at the time of the observation of the maximum value of the power, and an acceleration component in the second direction at the time of observation of the maximum value of the power to acquire horizontal peak information;
   a vertical direction detection element configured to acquire, based on the acceleration information acquired by the acceleration detection element, times of observation of a maximum value and a minimum value of the acceleration in the vertical direction to acquire vertical peak information;
   a peak analysis element configured to choose, based on the vertical peak information acquired by the vertical direction detection element, information related to the maximum value of the power contained in the horizontal peak information acquired by the horizontal direction detection element, to acquire peak information for estimation; and
   a direction of travel estimation element configured to acquire traveling direction information indicating a direction of travel of the pedestrian based on the peak information for estimation acquired by the peak analysis element.

2. A pedestrian observation system according to claim 1, wherein the vertical direction detection element acquires kicking leg information related to a kicking leg of the pedestrian, and
the peak analysis element associates information on the maximum value of the power contained in the peak information for estimation and information for identifying the kicking leg with each other based on the kicking leg information acquired by the vertical direction detection element.

3. A pedestrian observation system according to claim 1, further comprising
a determination element configured to determine whether or not the pedestrian is walking while swinging an arm thereof that carries the acceleration detection element back and forth, and
wherein, when it has been determined by the determination element that the pedestrian is walking while swinging the arm thereof carrying the acceleration detection element back and forth, the vertical direction detection element acquires a minimum value of the acceleration in the vertical direction as the vertical peak information based on the acceleration information acquired by the acceleration detection element, and
the peak analysis element acquires the peak information for estimation in accordance with a determination result by the determination element.

4. A pedestrian observation system according to claim 3, wherein the direction of travel estimation element acquires the traveling direction information in accordance with a magnitude relation between a new minimum value of the acceleration in the vertical direction and an old minimum value of the acceleration in the vertical direction in chronological order.

5. A pedestrian observation system according to 1, further comprising:
a posture estimation element configured to acquire posture information indicating a posture of the acceleration detection element with respect to an observation coordinate system suitable for observation of a walking movement of the pedestrian;
a conversion element configured to, based on the posture information acquired by the posture estimation element, perform coordinate conversion for the acceleration information acquired by the acceleration detection element into the observation coordinate system to acquire converted acceleration information; and
a low-pass filter processing element configured to extract a low frequency component from the converted acceleration information acquired by the conversion element to acquire acceleration information for detection, and
wherein the horizontal direction detection element acquires the horizontal peak information based on the acceleration information for detection acquired by the low-pass filter processing element, and
the vertical direction detection element acquires the vertical peak information based on the acceleration information for detection acquired by the low-pass filter processing element.

6. A pedestrian observation system according to claim 5, wherein the posture estimation element acquires the posture information substantially in real time.

7. A pedestrian observation system according to claim 5, wherein the observation coordinate system is independent of movement of the pedestrian.

8. A pedestrian observation system according to claim 5, wherein the observation coordinate system is defined with respect to a body of the pedestrian.

9. A pedestrian observation comprising:
an acquisition element configured to acquire acceleration information acquired by an acceleration detection element accompanying a pedestrian in accordance with a terminal coordinate system defined in the acceleration detection element from the acceleration detection element;
a posture estimation element configured to acquire posture information indicating a posture of the acceleration detection element with respect to an observation coordinate system suitable for observation of a walking movement of the pedestrian;
a conversion element configured to perform coordinate conversion for the acceleration information acquired by the acquisition element based on the posture information acquired by the posture estimation element, to acquire converted acceleration information; and
a low-pass filter element configured to extract a low frequency component from the converted acceleration information acquired by the conversion element to acquire acceleration information for determination, and
wherein traveling direction information indicating a direction of travel of the pedestrian is calculated based on the acceleration information for detection.

10. A pedestrian observation system according to claim 9, wherein the posture estimation element acquires the posture information substantially in real time.

11. A pedestrian observation system according to claim 9, wherein the observation coordinate system is independent of movement of the pedestrian.

12. A pedestrian observation system according to claim 9, wherein the observation coordinate system is defined with respect to a body of the pedestrian.

13. A non-transitory computer-readable storage medium storing computer-readable instructions that, when executed by a computer, cause the computer to perform a method comprising:
obtaining a power of an acceleration in a horizontal plane based on an acceleration component in a first direction perpendicular to a vertical direction and an acceleration component in a second direction perpendicular to the vertical direction and the first direction, that are obtained from acceleration information acquired by an acceleration detection element accompanying a pedestrian in accordance with a terminal coordinate system defined in the acceleration detection element, thereby acquiring a time of observation of a maximum value of the power, an acceleration component in the first direction at the time of observation of the maximum value of the power, and an acceleration component in the second direction at the time of observation of the maximum value of the power to acquire horizontal peak information;
acquiring times of observation of a maximum value and a minimum value of the acceleration in the vertical direction to acquire vertical peak information;
choosing information on the maximum value of the power contained in the acquired horizontal peak information based on the acquired vertical peak information, to acquire peak information for estimation; and
acquiring traveling direction information indicating a direction of travel of the pedestrian based on the acquired peak information for estimation, performed by circuitry.

14. A non-transitory computer-readable storage medium storing computer-readable instructions that, when executed by a computer, cause the computer to perform a method comprising:
- acquiring acceleration information by an acceleration detection element accompanying a pedestrian in accordance with a terminal coordinate system defined in the acceleration detection element, from the acceleration determination element;
- acquiring posture information indicating a posture of the acceleration detection element with respect to an observation coordinate system suitable for observation of a walking movement of the pedestrian;
- performing coordinate conversion for the acquired acceleration information based on the acquired posture information to acquire converted acceleration information; and
- extracting a low frequency component from the converted acceleration information to acquire acceleration information for detection, performed by circuitry, wherein
- traveling direction information indicating a direction of travel of the pedestrian is calculated based on the acceleration information for detection.

15. A direction of travel estimation method for observing a movement of a pedestrian, comprising:
- acquiring acceleration information in accordance with a uniquely defined terminal coordinate system accompanying a pedestrian;
- obtaining a power of an acceleration in a horizontal plane based on an acceleration component in a first direction perpendicular to a vertical direction and an acceleration component in a second direction perpendicular to the vertical direction and the first direction, that are obtained from the acquired acceleration information, thereby acquiring a time of observation of a maximum value of the power, an acceleration component in the first direction at the time of the observation of that maximum value of the power, and an acceleration component in the second direction at the time of observation of that maximum value of the power to acquire horizontal peak information;
- acquiring times of observation of a maximum value and a minimum value of the acceleration in the vertical direction based on the acquired acceleration information to acquire vertical peak information;
- choosing information related to the maximum value of the power contained in the acquired horizontal peak information based on the acquired vertical peak information, to acquire peak information for estimation; and
- acquiring traveling direction information indicating a direction of travel of the pedestrian based on the acquired peak information for estimation.

16. A direction of travel estimation method for observing a movement of a pedestrian, comprising:
- acquiring acceleration information acquired by an acceleration detection element accompanying a pedestrian in accordance with a terminal coordinate system defined in the acceleration detection element;
- acquiring posture information indicating a posture of the acceleration detection element with respect to an observation coordinate system suitable for observation of a walking movement of the pedestrian;
- performing coordinate conversion for the acceleration information into the observation coordinate system based on the posture information, to acquire converted acceleration information; and
- extracting a low frequency component from the converted acceleration information to acquire acceleration information for detection, performed by circuitry, wherein
- traveling direction information indicating a direction of travel of the pedestrian is calculated based on the acceleration information for detection.

* * * * *